United States Patent
Mukaibara et al.

(10) Patent No.: US 9,049,313 B2
(45) Date of Patent: Jun. 2, 2015

(54) IMAGE FORMING APPARATUS THAT CONTROLS IMAGE FORMATION CONDITION

(71) Applicant: CANON KABUSHIKI KAISHA, Tokyo (JP)

(72) Inventors: Takuya Mukaibara, Susono (JP); Kenichi Fujii, Suntou-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/104,102

(22) Filed: Dec. 12, 2013

(65) Prior Publication Data
US 2014/0168677 A1    Jun. 19, 2014

(30) Foreign Application Priority Data

Dec. 19, 2012 (JP) ................................. 2012-277435
Dec. 19, 2012 (JP) ................................. 2012-277437

(51) Int. Cl.
| | |
|---|---|
| *H04N 1/60* | (2006.01) |
| *G03F 3/08* | (2006.01) |
| *G06K 9/00* | (2006.01) |
| *H04N 1/00* | (2006.01) |
| *H04N 1/407* | (2006.01) |
| *H04N 1/50* | (2006.01) |
| *G03G 15/00* | (2006.01) |

(52) U.S. Cl.
CPC ........... *H04N 1/00031* (2013.01); *H04N 1/407* (2013.01); *H04N 1/506* (2013.01); *G03G 15/00* (2013.01); *H04N 1/6044* (2013.01)

(58) Field of Classification Search
None
See application file for complete search history.

(56) References Cited

U.S. PATENT DOCUMENTS

| | | | |
|---|---|---|---|
| 5,481,340 A | 1/1996 | Nagao et al. | |
| 8,249,477 B2 * | 8/2012 | Masuda et al. | 399/60 |
| 8,531,696 B2 * | 9/2013 | Sawada et al. | 358/1.14 |
| 8,699,908 B2 * | 4/2014 | Kikuchi et al. | 399/71 |
| 2004/0008245 A1 * | 1/2004 | Hirai et al. | 347/129 |
| 2005/0030562 A1 * | 2/2005 | Hama et al. | 358/1.9 |
| 2005/0157327 A1 * | 7/2005 | Shoji et al. | 358/1.14 |
| 2007/0134014 A1 * | 6/2007 | Kato et al. | 399/49 |
| 2008/0145078 A1 * | 6/2008 | Tomita et al. | 399/60 |
| 2010/0008686 A1 * | 1/2010 | Masuda et al. | 399/51 |
| 2011/0002704 A1 * | 1/2011 | Fujita | 399/74 |
| 2011/0013920 A1 * | 1/2011 | Wada | 399/49 |

(Continued)

FOREIGN PATENT DOCUMENTS

| | | |
|---|---|---|
| JP | 3-134678 A | 6/1991 |
| JP | 7-20670 A | 1/1995 |

(Continued)

*Primary Examiner* — Madelein Nguyen
(74) *Attorney, Agent, or Firm* — Fitzpatrick, Cella, Harper & Scinto

(57) ABSTRACT

An image forming apparatus includes: a receiving unit configured to receive reflection light emitted by a light emitting unit, and output a detection signal corresponding to an amount of received reflection light; a detection unit configured to output, as an output signal, a signal corresponding to a difference between a value that corresponds to an amount of reflection light from a first position at which a detection image having one or more lines in a direction different from a movement direction is formed and a value that corresponds to an amount of reflection light from a second position different from the first position; and a control unit configured to control an image formation condition related to density of an image to be formed, based on a peak value of the output signal.

26 Claims, 32 Drawing Sheets

(56) References Cited

U.S. PATENT DOCUMENTS

| | | | |
|---|---|---|---|
| 2011/0058832 A1* | 3/2011 | Suzuki et al. | 399/49 |
| 2011/0311245 A1* | 12/2011 | Inada et al. | 399/31 |
| 2012/0075659 A1* | 3/2012 | Sawada et al. | 358/1.14 |
| 2012/0099165 A1* | 4/2012 | Omori et al. | 358/475 |
| 2012/0099883 A1* | 4/2012 | Kikuchi et al. | 399/71 |
| 2012/0155899 A1* | 6/2012 | Watanabe et al. | 399/49 |
| 2013/0022364 A1* | 1/2013 | Abe | 399/49 |
| 2013/0108292 A1* | 5/2013 | Suzuki et al. | 399/49 |
| 2013/0230332 A1* | 9/2013 | Ishii | 399/27 |
| 2013/0243458 A1* | 9/2013 | Suzuki et al. | 399/49 |
| 2014/0064759 A1* | 3/2014 | Komatsu et al. | 399/53 |
| 2014/0072315 A1* | 3/2014 | Ohmiya et al. | 399/49 |

FOREIGN PATENT DOCUMENTS

| | | |
|---|---|---|
| JP | 2001-109219 A | 4/2001 |
| JP | 2002-108030 A | 4/2002 |
| JP | 2005-249845 A | 9/2005 |
| JP | 2012-177723 A | 9/2012 |
| WO | 2013/002031 A1 | 1/2013 |
| WO | 2013/061737 A1 | 5/2013 |

* cited by examiner

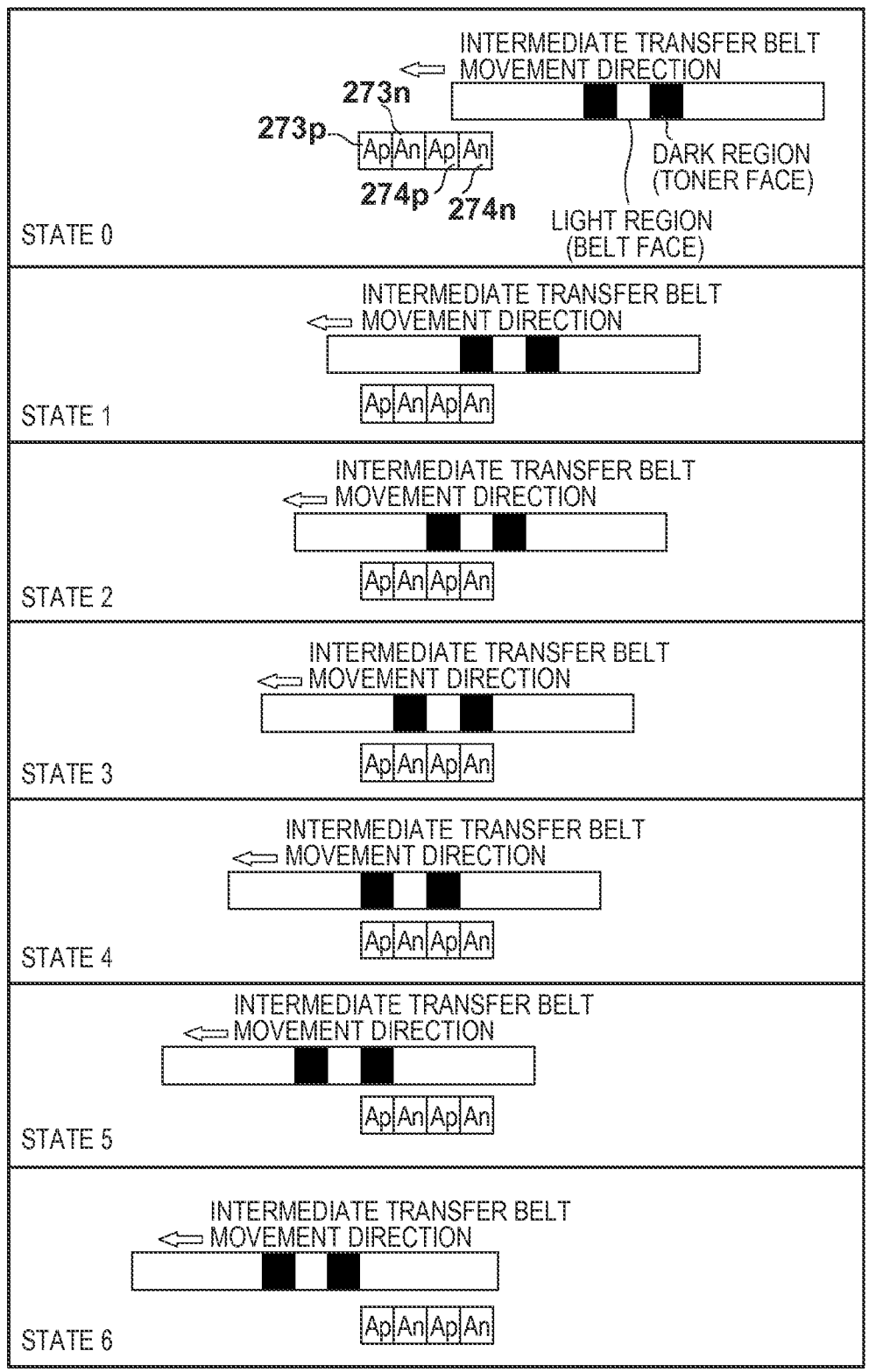

FIG. 9A    FIG. 9B    FIG. 9C
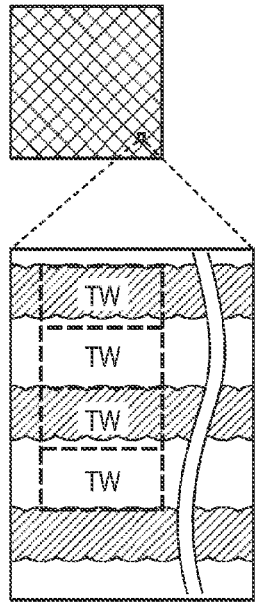 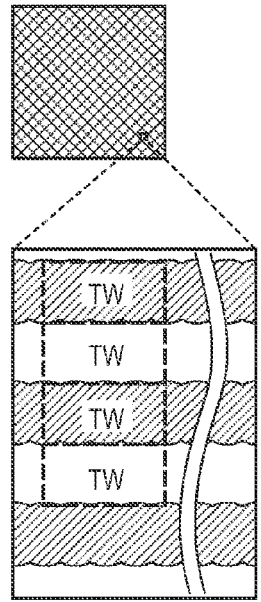 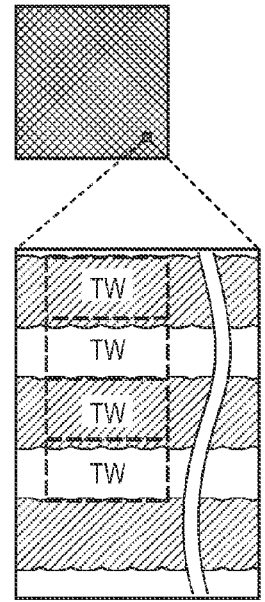
FIG. 9D                                    FIG. 9F
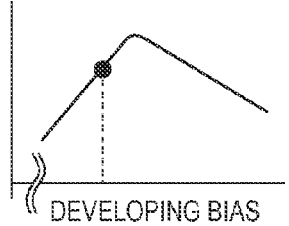 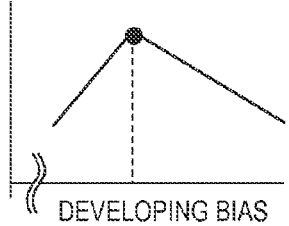 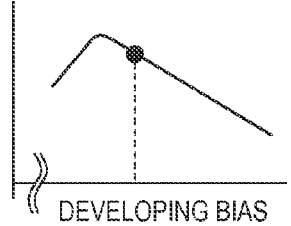
FIG. 9E

LASER LIGHT POWER
(PWM LEVEL)

F I G. 31

| HIGHEST DENSITY SETTING VALUE | TARGET LINE WIDTH [μm] |
|---|---|
| -5 | 102 |
| -4 | 107 |
| -3 | 112 |
| -2 | 117 |
| -1 | 122 |
| STANDARD | 127 |
| +1 | 132 |
| +2 | 137 |
| +3 | 142 |
| +4 | 147 |
| +5 | 152 |

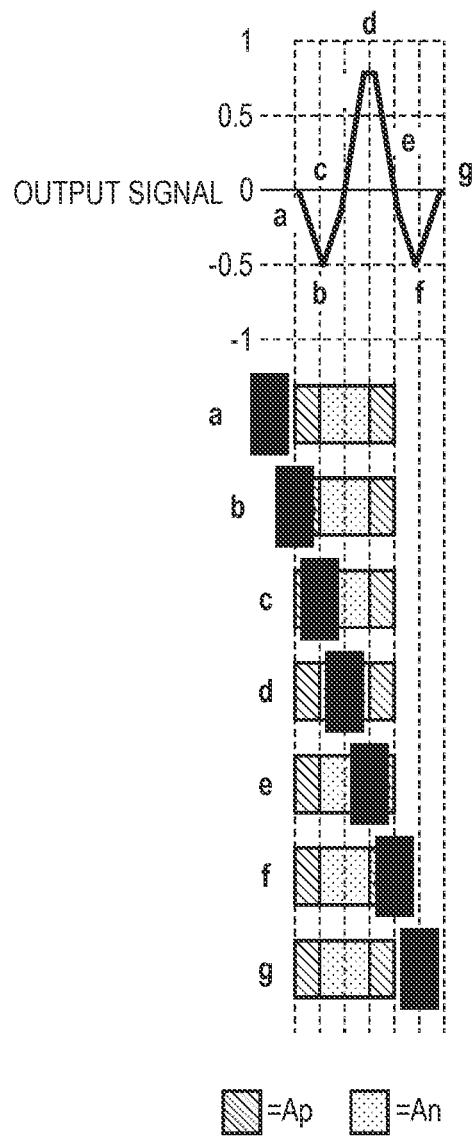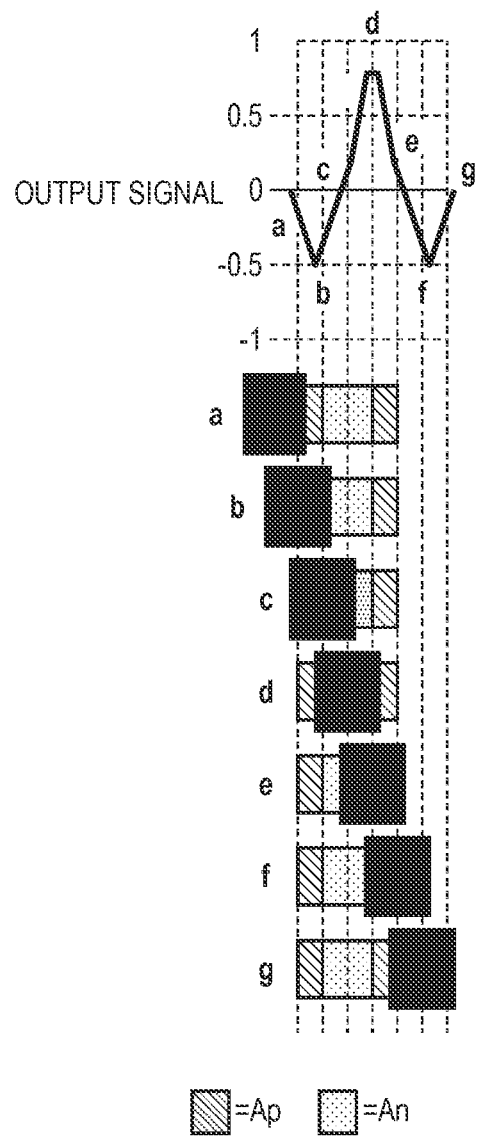

IMAGE FORMING APPARATUS THAT CONTROLS IMAGE FORMATION CONDITION

BACKGROUND OF THE INVENTION

1. Field of the Invention

The present invention relates to calibration in image forming apparatuses such as color laser printers, color copiers, and color fax machines that mainly employ an electrophotographic process.

2. Description of the Related Art

In recent years, it has become mainstream for electrophotographic color image forming apparatuses to have a tandem-type configuration in which a photosensitive member is provided separately for each color in order to improve the printing speed. In tandem-type image forming apparatuses, color shift and density correction (i.e., calibration) is executed by, for example, forming a detection image, which is a pattern for detecting color shift and the density, on the intermediate transfer belt, and detecting reflected light from the detection image using an optical sensor. This calibration is executed at various timings, such as when a cartridge containing a photosensitive member is exchanged, after a predetermined number of sheets have been printed, after a predetermined time period has elapsed, or when there is a change in the hygrothermal environment.

When image formation is successively performed on multiple recording materials in an image forming apparatus, there are cases where the internal temperature of the apparatus rises, image formation conditions change, and the image density and tinting change. For this reason, Japanese Patent Laid-Open No. 2001-109219 discloses a configuration in which calibration is executed successively while successive printing is performed. Specifically, detection image formation and detection are performed in a region of the intermediate transfer belt that is between the trailing edge of one image that is to be transferred to a recording material and the leading edge of another image that is to be transferred to the next recording material (referred to hereinafter as the "non-transfer region"). The configuration disclosed in Japanese Patent Laid-Open No. 2001-109219 eliminates the need to interrupt image formation in order to execute calibration.

Also, Japanese Patent Laid-Open No. H03-134678 discloses an optical sensor for reading detection images. The optical sensor disclosed in Japanese Patent Laid-Open No. H03-134678 has an LED and a phototransistor that receives specular reflection light and diffuse reflection light when a detection image is irradiated with light from the LED. When the density is detected using the optical sensor disclosed in Japanese Patent Laid-Open No. H03-134678, the detection image that is to be read is formed by toner in an area that is approximately 10 mm×10 mm. Here, it is desirable that the detection image used for density correction is as small as possible. This is because the smaller the detection image is, the lower the toner consumption amount is, and the shorter the time required for calibration is. For this reason, Japanese Patent Laid-Open No. H07-020670 discloses a configuration in which a small detection image can be used due to using a CCD sensor. However, CCDs are expensive, and although the detection image can be small when a CCD is used, the cost of the image forming apparatus rises.

In an image forming apparatus that uses an intermediate transfer belt, a cleaning blade or the like for removing toner images from the intermediate transfer belt is arranged downstream of the secondary transfer roller, which is for transferring toner images to recording materials, in the direction in which the intermediate transfer belt rotates. For this reason, a detection image formed in the non-transfer region will attach to the secondary transfer roller, and this gives rise to an underside smearing phenomenon in which toner in the detection image attaches to the underside of the subsequently passing recording material. This underside smearing can be prevented by causing the transfer bias output by the secondary transfer roller to be switched to the opposite polarity when the detection image passes the secondary transfer roller. However, even when control for switching the transfer bias to the opposite polarity is performed, if the density of the detection image is high, it remains that detection image will attach to the secondary transfer roller.

SUMMARY OF THE INVENTION

According to an aspect of the present invention, an image forming apparatus includes: an image carrier, an image forming unit configured to form, on the image carrier, a detection image that has one or more lines in a direction different from a movement direction of a surface of the image carrier; a light emitting unit configured to emit light toward the image carrier on which the detection image is formed; a light receiving unit configured to receive reflection light of the light emitted by the light emitting unit, and output a detection signal that corresponds to an amount of received reflection light including a specular reflection light component; a detection unit configured to output, as an output signal, a signal that corresponds to a difference between a detection signal value that corresponds to an amount of reflection light received from a first position at which the detection image is formed and a detection signal value that corresponds to an amount of reflection light received from a second position different from the first position; and a control unit configured to control an image formation condition related to density of an image to be formed, based on a peak value of the output signal of the detection unit.

Further features of the present invention will become apparent from the following description of exemplary embodiments with reference to the attached drawings.

BRIEF DESCRIPTION OF THE DRAWINGS

FIGS. 3A and 3B are diagrams for describing a signal output by the optical sensor according to an embodiment.

FIGS. 9A to 9F are diagrams showing a relationship between density variation and the output signal of the optical sensor according to an embodiment.

FIG. 31 is a diagram showing a conversion table used in highest density setting change processing according to an embodiment.

FIG. 36 is a diagram showing the output signal of the optical sensor in the case of detecting a pattern image whose line width is narrower than the target line width, according to an embodiment.

FIG. 37 is a diagram showing the output signal of the optical sensor in the case of detecting a pattern image whose line width is wider than the target line width, according to an embodiment.

DESCRIPTION OF THE EMBODIMENTS

Figure 1A:
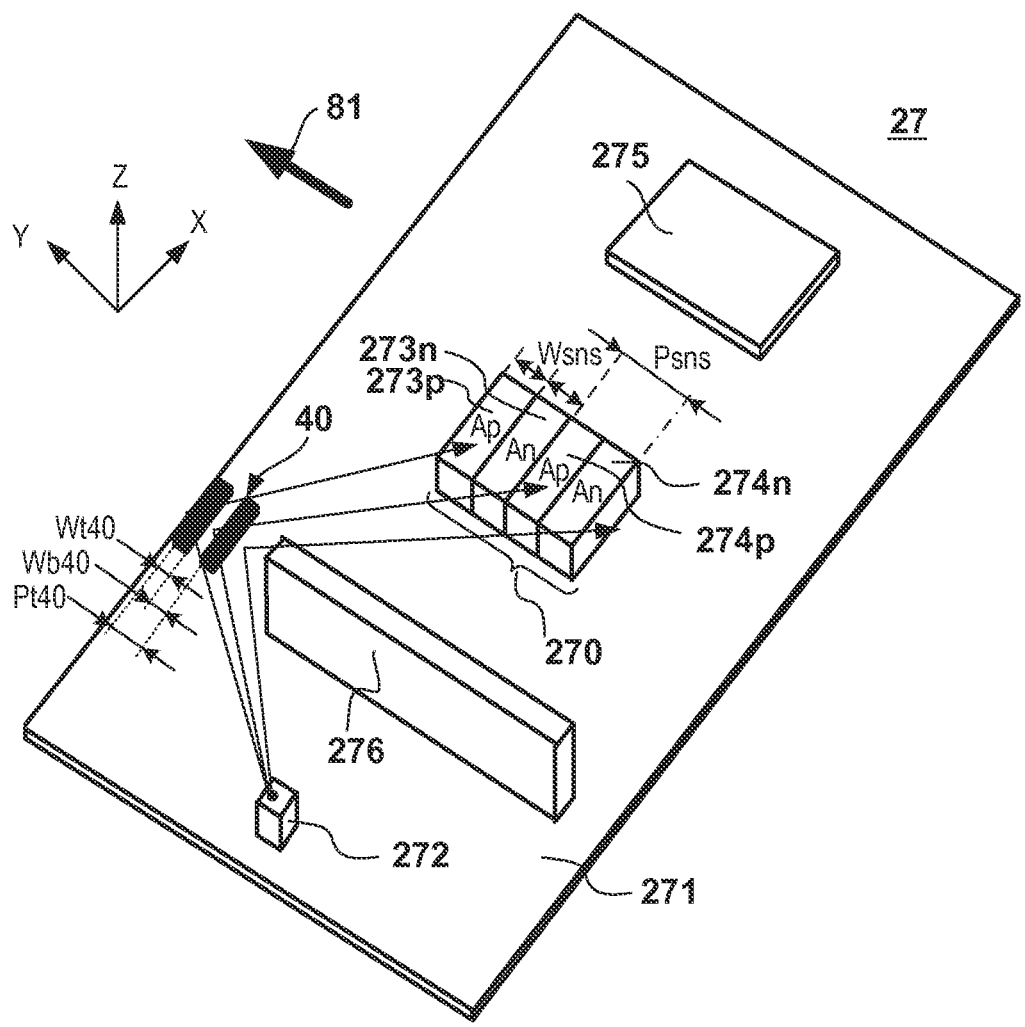
FIGS. 1A and 1B are diagrams showing an optical sensor according to an embodiment.

Exemplary embodiments of the present invention will be described hereinafter with reference to the accompanying drawings. Note that constituent elements that are not necessary in the description of the embodiments have been omitted for the drawings described below. Also, similar constituent elements will be denoted by similar reference numerals in the drawings described below.

First Embodiment

Figure 15:
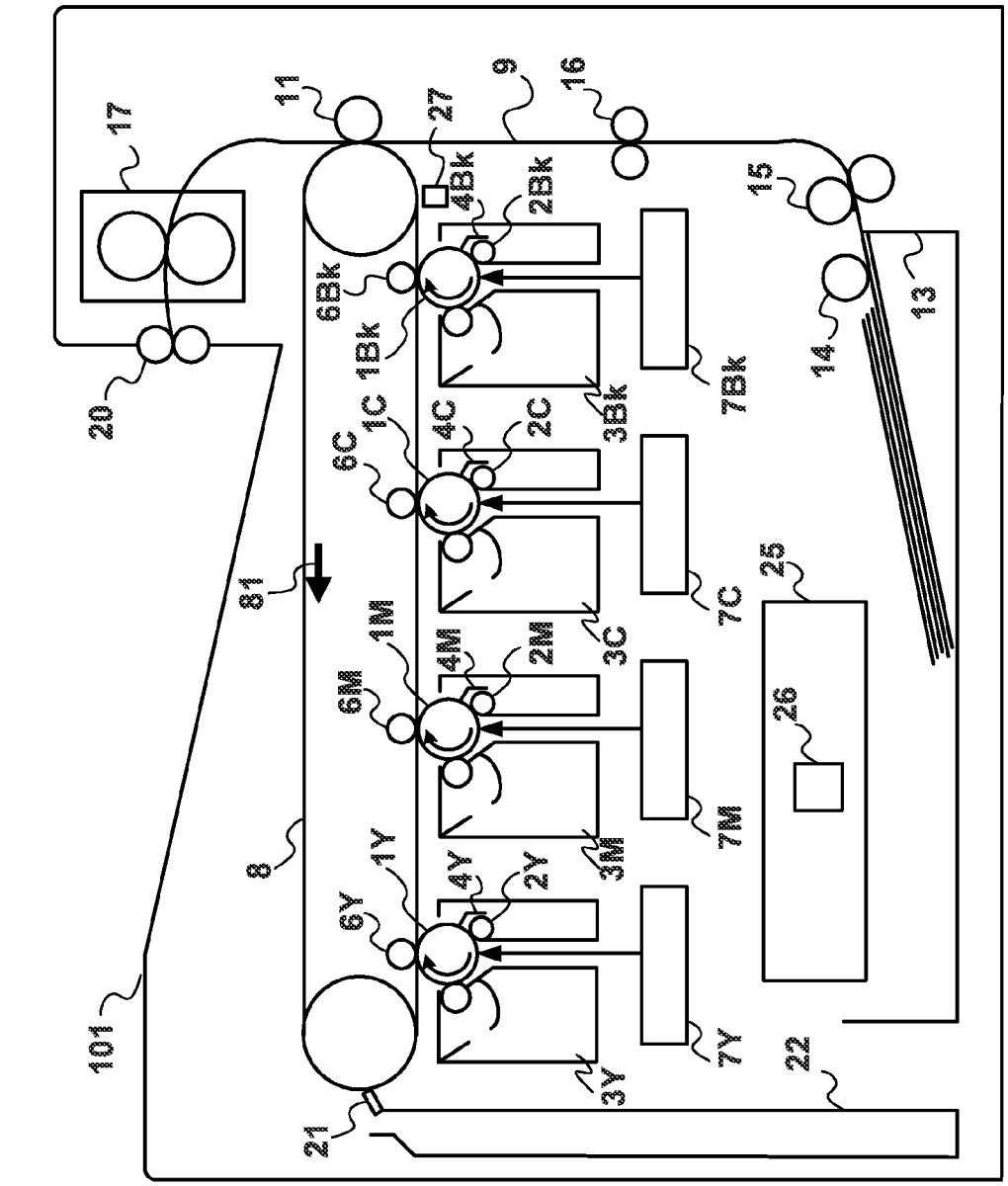
FIG. 15 is a diagram showing an image forming apparatus according to an embodiment.

First, an image forming apparatus 101 according to the present embodiment will be described with reference to FIG. 15. Y, M, C, and Bk appended to reference numerals in FIG. 15 indicate that the colors of the developer (toner) used by the corresponding members are yellow, magenta, cyan, and black. Note that reference numerals not appended with Y, M, C, and Bk will be used when there is no need to distinguish between colors in the following description. A charging unit 2 charges photosensitive member 1, which is an image carrier that is rotated in the direction indicated by the arrow in the figure, to a uniform potential, and an exposing unit 7 forms an electrostatic latent image on the photosensitive member 1 by irradiating the photosensitive member 1 with laser light. A developing unit 3 applies a developing bias so that toner, which is the developer, is supplied to the electrostatic latent image in order to cause the electrostatic latent image to become a visible toner image. A primary transfer roller 6 transfers the toner image on the photosensitive member 1 to an intermediate transfer belt 8 using a primary transfer bias. Note that the intermediate transfer belt 8 is rotated in the direction indicated by an arrow 81. A color image is formed by photosensitive members 1 transferring toner images to the intermediate transfer belt 8 on top of each other. A cleaning blade 4 removes toner that is not transferred to the intermediate transfer belt 8 and remains on the photosensitive member 1.

A recording material in a cassette 13 is conveyed by conveying rollers 14, 15, and 16 along a conveying path 9 to a secondary transfer roller 11. The secondary transfer roller 11 transfers the toner image on the intermediate transfer belt 8 to the recording material using a secondary transfer bias. Note that toner that is not transferred to the recording material and remains on the intermediate transfer belt 8 is removed by a cleaning blade 21, and is recovered in a waste toner recovery container 22. A fixing unit 17 applies heat and pressure to the recording material with the toner image transferred thereon in order to fix the toner image, and then the recording material is discharged to the outside of the apparatus by conveying rollers 20. Note that an engine control unit 25 is provided with a microcontroller 26, and performs sequence control with respect to various types of drive sources (not shown) of the image forming apparatus 101, various types of control using sensors, and the like. Also, an optical sensor 27 is provided at a position facing the intermediate transfer belt 8.

With a tandem-type color image forming apparatus for example, mechanical dimensions deviate from their design values due to assembly error during apparatus manufacturing, component tolerance, component thermal expansion, and the like, and this deviation causes positional deviation between colors. For this reason, a detection image for detecting color shift for various colors is formed on the intermediate transfer belt 8 or the like, and reflection light from the detection image that was formed is detected by the optical sensor 27. It is then possible to perform color shift correction by adjusting the image clock and writing position in the main scanning direction and sub scanning direction for each color based on the detection results. Also, with the image forming apparatus 101, it is possible for changes to occur in the tinting, density, and the like of output images due to change over time or successive printing. Density control is performed in order to correct this variation. In density control, a detection image for detecting the density for each color is formed on the intermediate transfer belt 8 or the like, and reflection light from the detection image that was formed is detected by the optical sensor 27. The highest density for each color and halftone gradation characteristics are then corrected by the feedback of the detection results to process formation conditions such as the laser light power and various voltage conditions. The optical sensor 27 generally performs density detection using a system of irradiating the detection image with a light source and detecting the intensity of reflection light using a light receiving element. A signal that corresponds to the intensity of reflection light is processed by the microcontroller 26 and fed back to the process formation conditions. Highest density control is performed for the purpose of keeping a constant color balance between the various colors, and preventing fixing faults and the spattering of images with overlaid colors due to the excessive attachment of toner. On the other hand, halftone gradation control is performed for the purpose of preventing the inability to form natural images due to the output density deviating from the input image signal, which is caused by non-linear input-output characteristics.

Figure 1B:
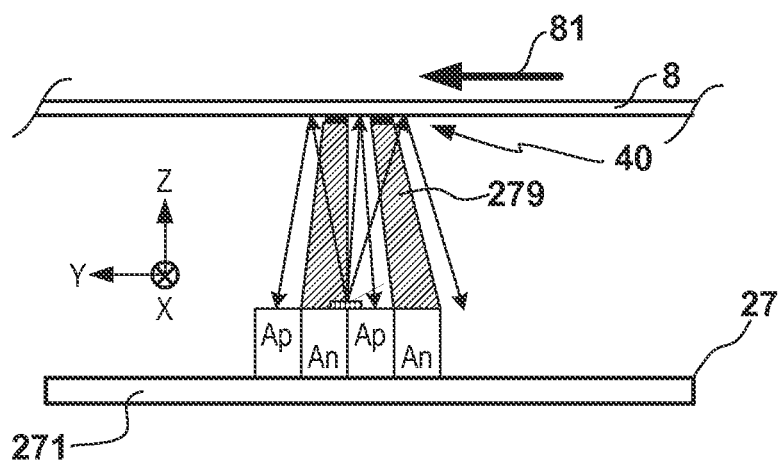

The following describes details of the optical sensor 27 of the present embodiment with reference to FIGS. 1A and 1B. FIG. 1A is a perspective view of the optical sensor 27, and FIG. 1B is a view from the X direction in FIG. 1A. The optical sensor 27 of the present embodiment has a light emitting element 272, a light receiving unit 270 in which light receiving elements 273n, 273p, 274n, and 274p are included, a control circuit 275, and a light blocking wall 276, all of which are arranged on a substrate 271. The light emitting element 272 has an LED chip that is not provided with a reflector, for example, and irradiates the intermediate transfer belt 8 with point-source divergent beams, without irradiation light focusing being performed by an optical member or the like. The light receiving elements of the light receiving unit 270 are arranged in an array along the movement direction 81 of the intermediate transfer belt 8. Each of the light receiving elements may be a photodiode that outputs a current that corresponds to the amount of received light, for example. Note that in the present embodiment, reflection light from the intermediate transfer belt 8 is converted into signals that correspond to the amount of received light in the light receiving elements without passing through an optical member for condensing or focusing the light, such as a light condensing lens. Also, in the following description, the light receiving element 273n and the light receiving element 274n are also referred to as light receiving units An, and the light receiving elements 273p and 274p are also referred to as light receiving units Ap. In other words, in the light receiving unit 270, the light receiving units Ap (first light receiving units) and the light receiving units An (second light receiving units) are arranged alternatingly. Although one light receiving unit Ap corresponds to one light receiving element 273p or 274p and one light receiving unit An corresponds to one light receiving element 273n or 274n in the present embodiment in this way, one light receiving unit Ap and one light receiving unit An may include multiple light receiving elements. In other words, in the present embodiment, light receiving units Ap and light receiving units An that are each configured by one or more light receiving elements are arranged alternatingly.

As shown in FIG. 1A, in the present embodiment, the widths of the light receiving units Ap and An in the alignment direction are equally Wsns, the pitches of the light receiving unit Ap and the light receiving unit An are the same, and the value of the pitch Psns is double the width of the light receiving unit Ap and the light receiving unit An. Note that the pitch of the light receiving unit Ap in the present embodiment means the distance between corresponding positions of adjacent light receiving units Ap, and does not mean the distance between adjacent light receiving units Ap. Similarly, the pitch of the light receiving unit An in the present embodiment means the distance between corresponding positions of adjacent light receiving units An, and does not mean the distance between adjacent light receiving units An. Note that in the present embodiment, the widths of the light receiving regions of the light receiving units Ap and the light receiving units An in the alignment direction are substantially equal to Wsns, and the areas of the light receiving regions of the light receiving units Ap and the light receiving units An are equal to each other.

The control circuit 275 is electrically connected to the light emitting element 272 and the light receiving unit 270, and has signal processing circuits described later. The light blocking wall 276 is provided in order to prevent light emitted from the light emitting element 272 from being incident on the light receiving unit 270 without being reflected by the intermediate transfer belt 8. Note that the surface of the intermediate transfer belt 8 is coated so as to be glossy, and thus substantially specularly reflects light emitted from the light emitting element 272. On the other hand, the toner portion of an image formed on the intermediate transfer belt 8 absorbs or diffusely reflects light emitted from the light emitting element 272. For example, in the case where the light source is a red LED, the irradiation light is absorbed by cyan and black toner, and is diffusely reflected by yellow and magenta toner. Also, in the case where the light source is an infrared LED, for example, the irradiation light is absorbed by black toner, and is diffusely reflected by yellow, magenta, and cyan toner. In FIGS. 1A and 1B, the light that is emitted from the light emitting element 272 and is specularly reflected by the surface of the intermediate transfer belt 8 is indicated by arrows. Note that in FIG. 1B, reference sign 279 indicates how, due to the irradiation light being absorbed by toner or diffusely reflected by toner, the intensity of the reflection light decreases in the region where the light receiving unit 270 is formed, that is to say, shadows are formed by the toner.

The following describes the relationship between a pattern image 40, which is a density detection image, and light that is projected on the light receiving unit 270. In the present embodiment, the pattern image 40 is a striped toner image obtained by two lines that extend in a direction orthogonal to the movement direction 81 of the surface of the intermediate transfer belt 8 being formed along the movement direction 81.

Note that although the example of the lines being most suitably solid lines is described in the present embodiment, it is possible to use dotted lines or broken lines made up of small patches. Note that the above-described number of lines that are formed is merely one example, and it is possible to have any number of lines that is two or more. Hereinafter, the portion between the lines in the pattern image 40 will be referred to as a "space". As shown in FIG. 1A, the line width of the pattern image 40 of the present embodiment is Wt40, the space width is Wb40, and the inter-line pitch is Pt40. Note that the line width of the pattern image 40 is at the level of several dots (one dot being 42.3 μm at the resolution of 600 dpi), for example. Note that the inter-line pitch in the present embodiment means the distance between corresponding positions of two adjacent lines, and does not mean the width of the space.

Since the light emitting element 272 is a type of LED that emits point-source divergent beams, the image from the pattern image 40 formed on the intermediate transfer belt 8 is projected onto the light receiving unit 270 at a predetermined scale factor. Since the intermediate transfer belt 8 and the substrate 271 are arranged parallel to each other in the present embodiment, the light from the light emitting element 272 that is incident on the intermediate transfer belt 8 and the specular reflection light are equiangular. Furthermore, the light emitting element 272 and the light receiving unit 270 are configured so as to have the same surface height on the substrate 271. Thus, the lengths of the optical paths of the incident light (outgoing path) and the specular reflection light (incoming path) are the same. For this reason, the striped pattern image 40 formed on the intermediate transfer belt 8 is projected on the light receiving unit 270 as an image of twice the size. In other words, the line width Wt40, the space width Wb40, and the inter-line pitch Pt40 of the pattern image 40 on the intermediate transfer belt 8 are all doubled when projected on the light receiving unit 270. The light and dark regions formed by the double-size pattern image 40 at the location of the light receiving unit 270 move in accordance with movement of the intermediate transfer belt 8, and the light receiving units Ap and the light receiving units An are arranged along the movement direction of these light and dark regions (first direction).

Figure 2:
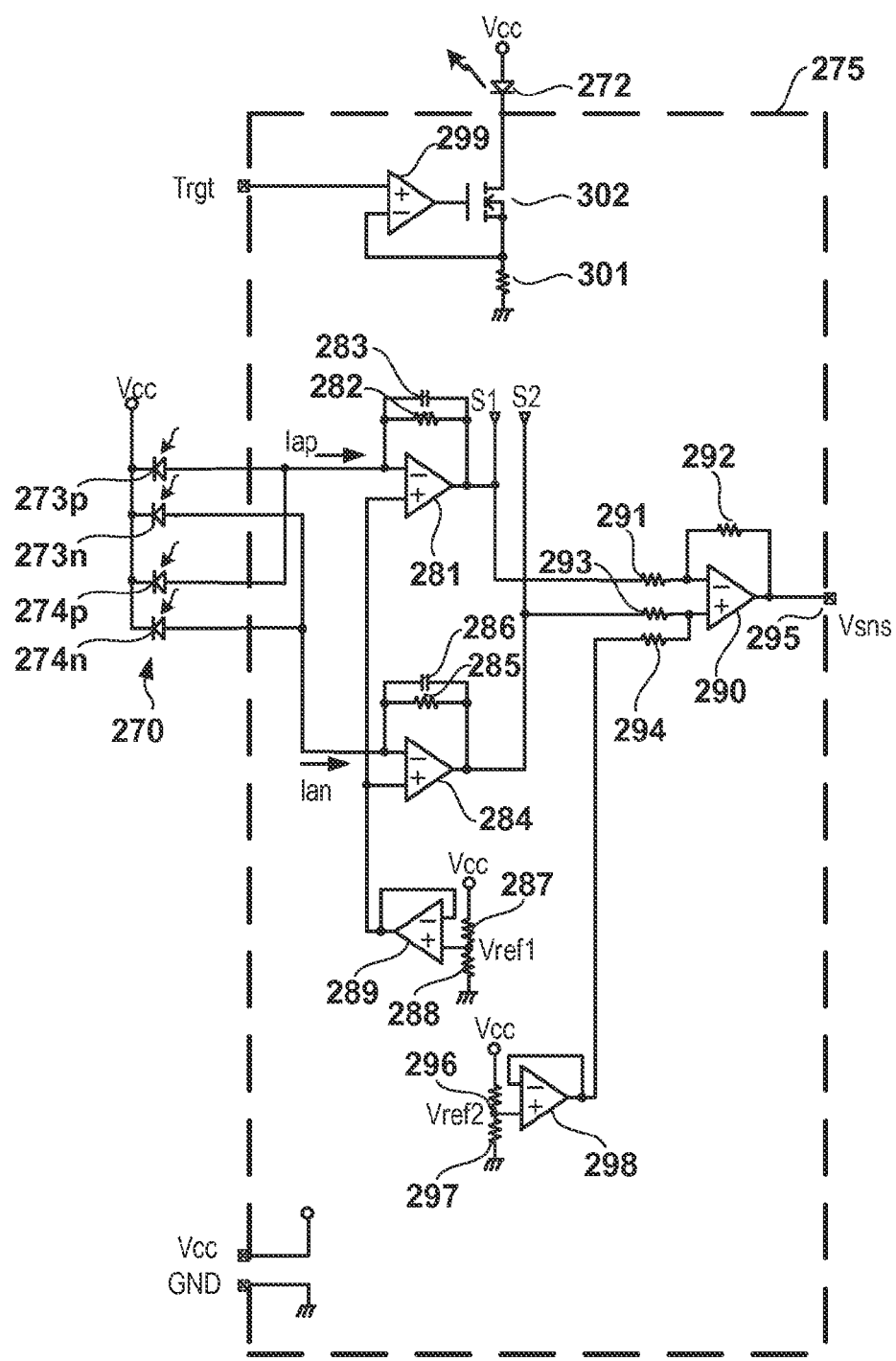
FIG. 2 is a diagram showing a control circuit of the optical sensor according to an embodiment.

Next, the control circuit 275 will be described with reference to FIG. 2. The control circuit 275 is connected to the light receiving unit 270 on the substrate 271. Furthermore, the control circuit 275 is internally connected to the light receiving elements 273*p* and 274*p* that configure the light receiving units Ap, and is internally connected to the light receiving elements 273*n* and 274*n* that configure the light receiving units An. Also, the light receiving units Ap are connected to an IV converter/amplifier 281, and the light receiving units An are connected to an IV converter/amplifier 284. When the light receiving unit 270 receives light, a current Iap that corresponds to the total amount of light received by the light receiving units Ap and a current Ian that corresponds to the total amount of light received by the light receiving units An are converted into voltages by the respective IV converter/amplifiers.

A reference voltage Vref1 generated by the voltage division of a voltage Vcc by resistors 287 and 288 is input by a voltage follower 289 to the non-inverting input terminals of the IV converter/amplifiers 281 and 284. Accordingly, when the light receiving unit 270 is not receiving light, the IV converter/amplifiers 281 and 284 output the reference voltage Vref1, and when it has received light, the IV converter/amplifiers 281 and 284 respectively output a voltage S1 and a voltage S2, which are represented by the following equations.

$$S1 = Vref1 - (R282 \times Iap)$$

$$S2 = Vref1 - (R285 \times Ian)$$

Here, R282 is the resistance value of the resistor 282, and R285 is the resistance value of the resistor 285. Note that capacitors 283 and 286 are provided in order to perform phase compensation and noise removal.

A reference voltage Vref2 is input from a voltage follower 298 to the non-inverting input terminal of a differential amplifier 290 that is provided along with resistors 291 to 294. Note that the reference voltage Vref2 is generated by the voltage division of the voltage Vcc by resistors 296 and 297. The differential amplifier 290 subjects the reference voltage Vref2, S1, and S2 to differential amplification, and outputs the resulting sensor signal Vsns (Vsns=Vref2+S2−S1), which is the output signal of the optical sensor 27, to a terminal 295. Accordingly, when the total amount of light received by the light receiving units Ap and the total amount of light received by the light receiving units An are the same, the voltage of the sensor signal is the reference voltage Vref2. On the other hand, when the total amount of light received by the light receiving units Ap is higher than the total amount of light received by the light receiving units An, the voltage of the sensor signal is higher than the reference voltage Vref2. In contrast, when the total amount of light received by the light receiving units Ap is lower than the total amount of light received by the light receiving units An, the voltage of the sensor signal is lower than the reference voltage Vref2. In other words, the optical sensor 27 outputs a signal whose amplitude corresponds to a value obtained by subtracting the total amount of light received by the light receiving units An from the total amount of light received by the light receiving units Ap.

Next, a lighting circuit of the light emitting element 272 will be described. The control circuit 275 is provided with an operational amplifier 299 and supplementary circuits in order to drive the light emitting element 272 with a constant current. The operational amplifier 299 drives a transistor 302 so as to drive the light emitting element 272 with a current and thus light the light emitting element 272. When the light emitting element 272 is lit, the current flowing through it is detected by a resistor 301 and monitored at the inverting input terminal of the operational amplifier 299. On the other hand, the non-inverting input terminal of the operational amplifier 299 is connected to a voltage input terminal Trgt for the setting of the drive current of the light emitting element 272 by the microcontroller 26. In other words, the operational amplifier 299 drives the light emitting element 272 with a constant current such that the drive voltage is the value set by the terminal Trgt.

Figure 3B:
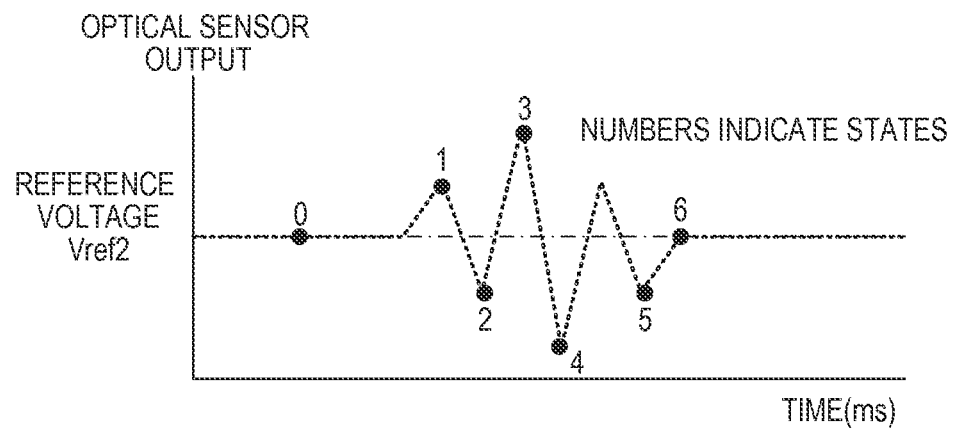

The following describes the output signal when the optical sensor 27 has detected the pattern image 40 on the intermediate transfer belt 8. In order to detect the pattern image 40, the microcontroller 26 lights the light emitting element 272, and the light receiving unit 270 detects reflection light. A current that corresponds to the amount of received light is output from the light receiving unit 270 and processed by the above-described control circuit 275, and the resulting signal is output as the sensor signal. FIG. 3A shows various positional relationships between the light receiving unit 270 of the optical sensor 27 and the light and dark regions of light that appear at the location of the light receiving unit 270 due to the pattern image 40 formed on the intermediate transfer belt 8. Note that although the light and dark regions of light actually appear on the light receiving unit 270, they are shown shifted vertically in FIG. 3A for ease of understanding. FIG. 3B shows the relationship between the output signal of the optical sensor 27 and the various states in FIG. 3A. Note that it is assumed here that the line and space widths Wt40 and Wb40 of the pattern image 40 formed on the intermediate transfer belt 8 are equal to each other, and are furthermore half of the width Wsns of the light receiving units Ap and the light receiving units An.

State 0 is a state in which shadows from the lines in the pattern image 40 on the intermediate transfer belt 8 do not arrive in the detection region of the optical sensor 27, and specular reflection light is incident on all of the light receiving units Ap and the light receiving units An. Accordingly, the output of the optical sensor 27 at this time is the analog reference voltage Vref2, as indicated by "0" in FIG. 3B.

State 1 is a state in which the shadow from one line in the pattern image 40 covers one light receiving unit An. In this state, specular reflection light is not received by one of the light receiving units An, and therefore the current Ian decreases by substantially half, and the output S2 is higher than the output S1. Accordingly, the output of the optical sensor 27 at this time has a higher potential than the analog reference voltage Vref2, as indicated by "1" in FIG. 3B.

State 2 is a state in which the intermediate transfer belt 8 has a moved, and thus the shadow from one line in the pattern image 40 covers one light receiving unit Ap. In this state, specular reflection light is not received by one of the light receiving units Ap, and therefore the current Iap decreases by substantially half, and the output S1 is higher than the output S2. Accordingly, the output of the optical sensor 27 has a lower potential than the analog reference voltage Vref2, as indicated by "2" in FIG. 3B.

State 3 is a state in which the intermediate transfer belt 8 has moved farther, and shadows from lines in the pattern image 40 cover all of the light receiving units An. In this state, specular reflection light is not received by any of the light receiving units An, the current Ian decreases to substantially 0, and the output S2 is the highest value. Accordingly, the output of the optical sensor 27 at this time is the highest value, as indicated by "3" in FIG. 3B. Note that the pattern image 40 is formed with a pitch according to which, if the color of the toner in the pattern image 40 is a color that diffuses the irradiation light, diffuse reflection light from the lines in the pattern image 40 is emitted onto all of the light receiving elements in a uniformly diffused state, and therefore the amounts of change in the currents Iap and Ian due to the diffusion light are the same. Accordingly, diffuse reflection light is canceled out by differential processing in the control circuit 275, and the output signal of the optical sensor 27 is not influenced by diffuse reflection light.

State 4 is a state in which the intermediate transfer belt 8 has moved farther, and shadows from lines in the pattern image 40 cover all of the light receiving units Ap. In this state, specular reflection light is not received by any of the light receiving units Ap, the current Iap decreases to substantially 0, and the output S1 is the highest value. Accordingly, the output of the optical sensor 27 at this time is the lowest value, as indicated by "4" in FIG. 3B.

State 5 is a state in which the intermediate transfer belt 8 has moved farther, and the shadow from one line in the pattern image 40 covers one light receiving unit Ap. In this state, specular reflection light is not received by one of the light receiving units Ap, and therefore the output of the optical sensor 27 has a lower potential than the analog reference voltage Vref2, as indicated by "5" in FIG. 3B.

State 6 is a state in which the intermediate transfer belt 8 has moved farther, and shadows from lines in the pattern image 40 fall outside the light receiving unit 270, and therefore similarly to state 0, the voltage output by the optical sensor 27 is the analog reference voltage Vref2.

Figure 5:
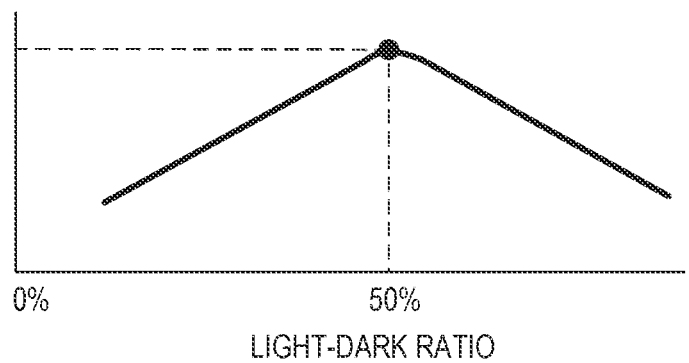
FIG. 5 is a diagram showing characteristics of the amplitude value of the signal output by the optical sensor according to an embodiment.

As described above, the optical sensor 27 outputs a sensor signal that varies in a manner centered about the reference voltage Vref2 as light and dark regions of light from the projection of the pattern image 40 pass over the light receiving unit 270. The optical sensor 27 outputs a signal whose amplitude corresponds to a value obtained by subtracting the total amount of light received by the light receiving units An from the total amount of light received by the light receiving units Ap, and therefore the peak value of the amplitude is highest when the duty ratio of the light and dark regions of light from the projection of the pattern image 40 is 50%, that is to say, when the widths of the light regions and the dark regions are the same. FIG. 5 shows the relationship that the ratio of the light and dark regions with the highest value of the amplitude of the output signal of the optical sensor 27.

Figure 4:
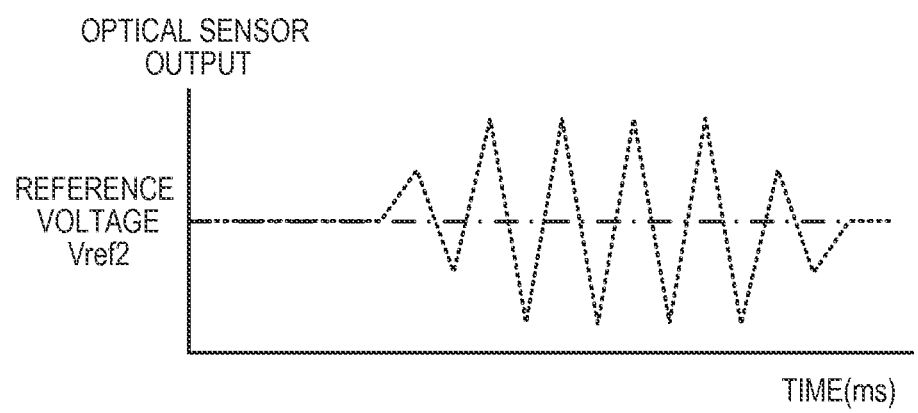
FIG. 4 is a diagram showing a signal output by the optical sensor according to an embodiment.

Note that although the pattern image 40 has two lines in FIG. 3A, the pattern image 40 can have any number of lines. FIG. 4 shows the output signal of the optical sensor 27 when a pattern image 40 having five lines is formed. In the case where the pattern image has five lines, it can be understood from a comparison with the output signal shown in FIG. 3B that the number of times the highest amplitude and the lowest amplitude appear increases by three times, which corresponds to the amount by which the number of lines was increased.

Next, the pattern image 40 and the arrangement pitch of the light receiving units Ap and An of the optical sensor 27 will be described. The arrangement pitch of the light receiving units Ap and An of the optical sensor 27 shown in FIG. 1, that is to say, Psns in FIG. 1A, can be set to various values. The pitch of the lines in the pattern image 40, on the other hand, is limited according to the resolution of the image forming apparatus. For example, if the resolution of the image forming apparatus is 600 dpi, the size of one dot is approximately 42.3 µm. Accordingly, a striped pattern formed with toner can basically be formed in only units of integral multiples of this value in the sub scanning direction. On the other hand, the striped pattern formed on the intermediate transfer belt 8 and the specular reflection image thereof that is projected on the light receiving unit 270 using the optical sensor 27 have a size ratio of 1:2 in the present embodiment. In other words, the arrangement pitch (Psns) of the light receiving units An and Ap of the optical sensor 27 is most suitably double the size of one dot of the image forming apparatus, and the light receiving units An and Ap of the present embodiment are formed with this arrangement pitch.

Next, a method of forming the above-described striped pattern image 40 will be described. In the present embodiment, to form a striped pattern having a line and space width of K dots (K being an integer), image data indicating M dots for a line and N dots for a space (M<N, M and N being integers) are used. Note that the relationship of M, N and K is M+N=2K in the present embodiment.

Figure 6A:
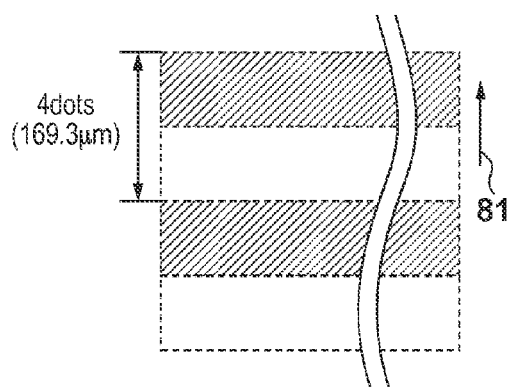
FIGS. 6A to 6F are diagrams for describing a pattern image formation method according to an embodiment.
Figure 6B:
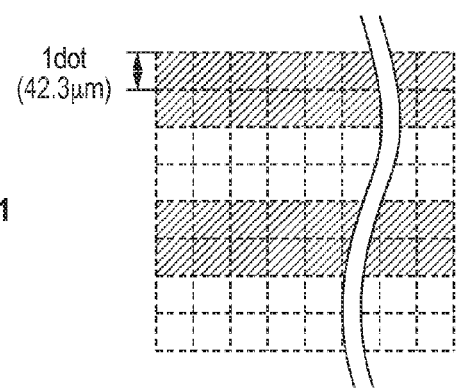

FIGS. 6A to 6F are diagrams for describing a method of forming the pattern image 40, which is a repeated pattern of 2-dot lines and 2-dot spaces. FIG. 6A shows the pattern image 40 that is to be formed. Since the lines and spaces are each made up of 2 dots, the pitch of the lines in the pattern image 40 is 4 dots (approximately 169.3 µm). FIG. 6B is FIG. 6A with the addition of partition lines at units of 1 dot. In the image forming apparatus, an image is formed by image data pieces that are received one per dot. The line width and the space width are both equally 2 dots, and the ratio of lines to spaces in the image data is 50:50, that is to say, the duty ratio is 50%.

Figure 6C:
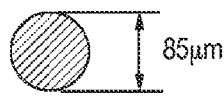
Figure 6D:
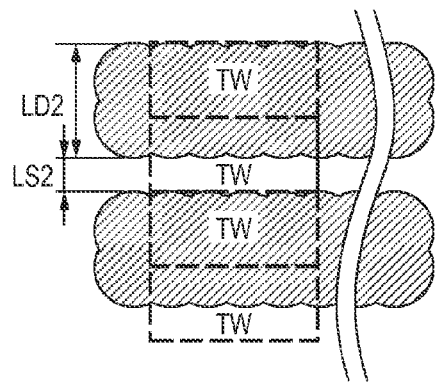

However, the duty ratio of the pattern image 40 that is developed is not 50%. FIG. 6C shows a developed toner image of one dot. As shown in FIG. 6C, the toner image that is actually developed does not conform to an ideal 1-dot square area, but rather is substantially circular with a size larger than the ideal 42.3 μm square size. For example, the diameter is approximately 85 μm in FIG. 6C. FIG. 6D shows the pattern image 40 that is formed when the dot diameter of the toner image is 85 μm as shown in FIG. 6C. As shown in FIG. 6D, the developing regions of adjacent toner image dots overlap each other, and the width of two adjacent dots in the sub scanning direction of the toner image, that is to say, the line width LD2, is higher than the target value TW. Accordingly, the space width LS2 is lower than the target value TW. In other words, the duty ratio of the pattern image 40 that is formed is not 50%.

Figure 6E:
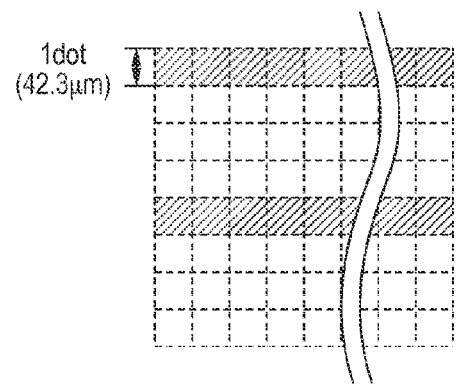
Figure 6F:
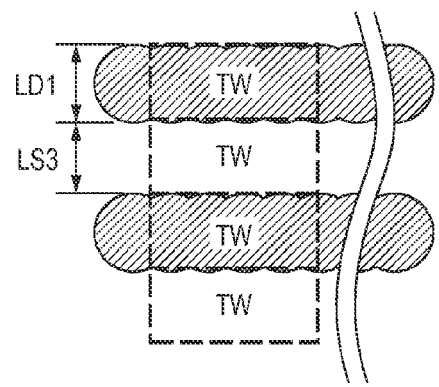

Accordingly, in the present embodiment, as shown in FIG. 6E, the pattern image 40 is formed using image data in which one line is made up of 1 dot, and one space is made up of 3 dots. FIG. 6F shows the pattern image 40 that is formed using the image data shown in FIG. 6E. Note that the 1-dot toner image diameter is 85 μm as shown in FIG. 6C. As shown in FIG. 6F, the toner line width LD1 is 85 μm, which is substantially equal to the target value TW (2 dots). Accordingly, the space width LS3 is also substantially equal to the target value TW. In other words, by forming the pattern image 40 using image data in which one line is made up of 1 dot and one space is made up of 3 dots, it is possible to form a pattern image 40 whose duty ratio is substantially 50%. In other words, if the 1-dot toner image diameter is 85 μm as in this example, the actual toner image will be approximately 1 dot larger than the size of 1 dot at 600 dpi (approximately 42.3 μm), and the actual width of the space portion will be approximately 1 dot smaller. Accordingly, in this example, if one line is M dots, one space is N dots, and the relationship N=M+2 is satisfied, it is possible for the ratio of lines to spaces in the developed toner image to be approximately 50:50. If the diameter of the toner image were approximately 100 μm, the ratio of lines to spaces in the developed toner image can be made approximately 50:50 by causing the relationship N=M+3 to be satisfied. This can be expressed with the following equation.

$$N=M+(A-1)\times 2$$

Here, A is the ratio of the diameter of 1 dot that is actually formed to the calculated diameter of 1 dot in the toner image. Note that since N is an integer, the value obtained in the above equation is rounded up or down to an integer. The following equations are used when the toner image diameter is 85 μm and 100 μm.

$$N=M+(2-1)\times 2=M+2$$

$$N=M+(2.5-1)\times 2=M+3$$

Figure 7:
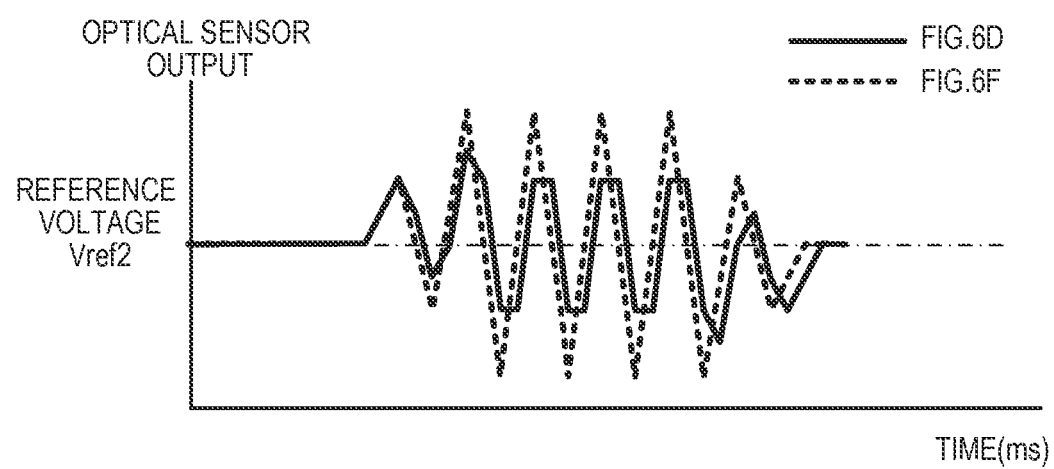
FIG. 7 is a diagram showing output signals of the optical sensor with respect to the pattern images shown in FIGS. 6D and 6F.

As has already be described, if the duty ratio of the pattern image that is formed is not 50%, the peak value of the output signal of the optical sensor 27 decreases as shown in FIG. 5. FIG. 7 shows sensor signals output by the optical sensor 27 when using the pattern image shown in FIG. 6D and the pattern image shown in FIG. 6F.

The following describes a method of forming the pattern image 40 in the non-transfer region and detecting density variation during printing. Note that it is assumed that the image forming apparatus 101 performs conventionally well-known density control when print processing is not being performed, for example. Also, although the following processing is performed for each color, the following only describes processing with respect to one color. First, after normal density control has been performed, the image forming apparatus 101 specifies and sets the laser light exposure intensity (i.e., power) that is to serve as a reference for forming a pattern image having a duty ratio that is substantially precisely 50%.

Figure 10A:
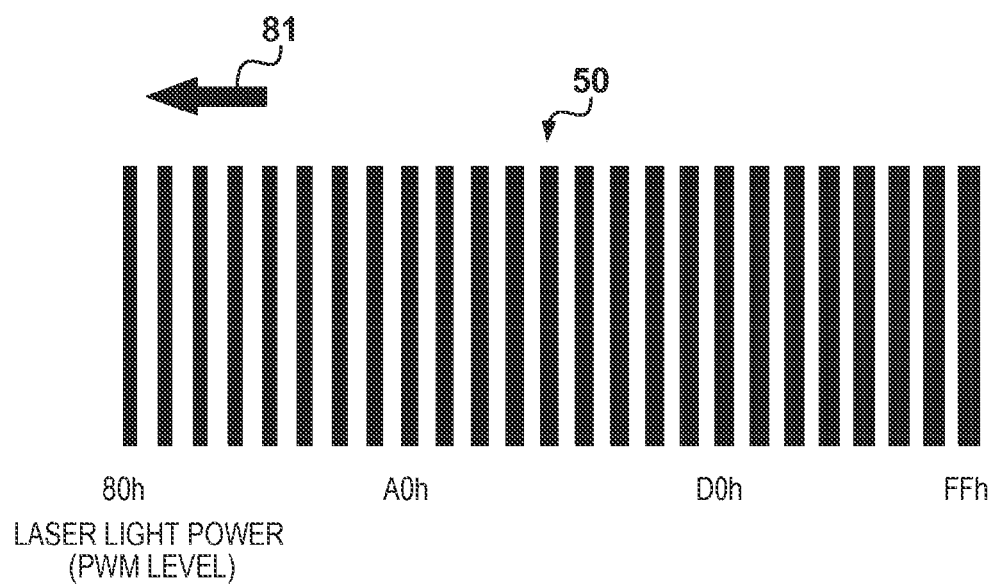
FIGS. 10A and 10B are diagrams for describing laser light power determination.
Figure 10B:
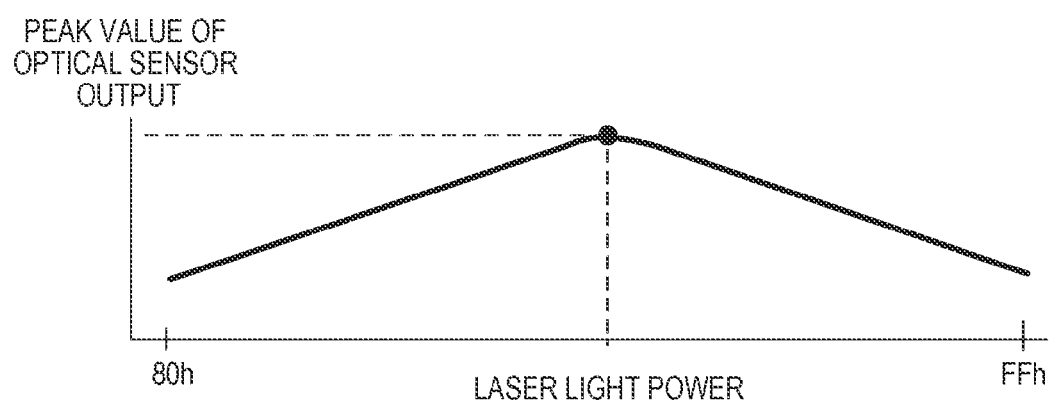

The following describes the determination of the laser light power that is to serve as a reference. Note that as has already been described, since a pattern image 40 with a line width and space width that are both 2 dots is formed in the present example, image data for forming 1-dot lines and 3-dot spaces is used. As shown in FIG. 10A, the microcontroller 26 forms a striped pattern image 50 in which the laser light power changes in a stepwise fashion on the intermediate transfer belt 8. Note that 80h, FFh, and the like in FIG. 10A indicate the power of laser light subjected to PWM control with 256 levels. The pattern image 50 is then detected by the optical sensor 27. As shown in FIG. 10B, the peak value of the output signal of the optical sensor 27 is the highest when the duty ratio is 50%. Accordingly, the microcontroller 26 specifies the position in the pattern image 50 at which the peak value of the output signal of the optical sensor 27 is the highest, and determines the laser light power that was used when forming the specified position. This determined laser light power is considered to be the laser light power at which the line duty ratio is 50%. The laser light power obtained in this way, as well as the developing bias that was used by the developing unit 3 when forming the pattern image 50 are used by the microcontroller 26 in subsequent image formation.

At this time, the image forming apparatus 101 operates in accordance with the position indicated by a black circle in the graph of FIG. 9E, which shows the relationship between the developing bias and the amplitude value of the output signal of the optical sensor 27. Also, the pattern image having the duty ratio of 50% shown in FIG. 9B is formed using this developing bias. Note that FIG. 9B shows the pattern image and a micro-level enlargement of the pattern image.

If the density changes from the state shown in FIG. 9E, the relationship between the developing bias and the peak value of the output of the optical sensor 27 shifts as indicated by the black circles in FIGS. 9D and 9F. Accordingly, if the developing bias is used without being changed, the duty ratio of the pattern image will not be 50%, as shown in FIGS. 9A and 9C. Note that FIG. 9A shows a pattern image that corresponds to the state shown in FIG. 9D, and FIG. 9C shows a pattern image that corresponds to the state shown in FIG. 9F. It should also be noted that FIGS. 9A and 9C show the corresponding pattern images and a micro-level enlargement of the pattern images. In the present embodiment, density correction is performed during print processing by controlling the developing bias so as to achieve the state shown in FIG. 9E during print processing.

Figure 11A:
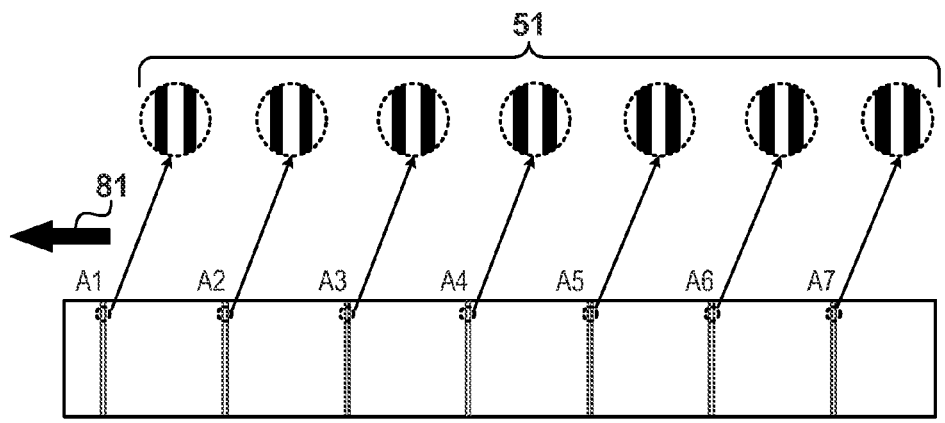
FIGS. 11A to 11C are diagrams for describing developing bias determination according to an embodiment.

In the case of performing density correction during printing, the image forming apparatus 101 of the present embodiment forms a pattern image 51 shown in FIG. 11A in a non-transfer region of the intermediate transfer belt 8, that is to say, in a region between images that are to be printed. In FIG. 11A, the pattern image 51 includes 2 lines, and this pattern image 51 is formed at seven positions A1 to A7 in the non-transfer region. Note that another number of pattern images 51 may be formed in one non-transfer region, and the pattern image 51 may be formed in multiple non-transfer regions. In other words, it is possible to, for example, form the four pattern images 51 denoted by A1 to A4 in one non-transfer region, and form the three pattern images 51 denoted by A5 to A7 in another non-transfer region. Furthermore, it is possible to form the seven pattern images 51 denoted by A1 to A7 in mutually different non-transfer regions. In the present embodiment, the developing bias is changed in a stepwise manner when forming the respective pattern images 51. Note that in FIG. 11A, the developing bias is the lowest when forming the pattern image 51 at the position A1, and the developing bias is thereafter successively increased, with the developing bias being the highest when forming the pattern image 51 at the position A7.

Figure 11B:
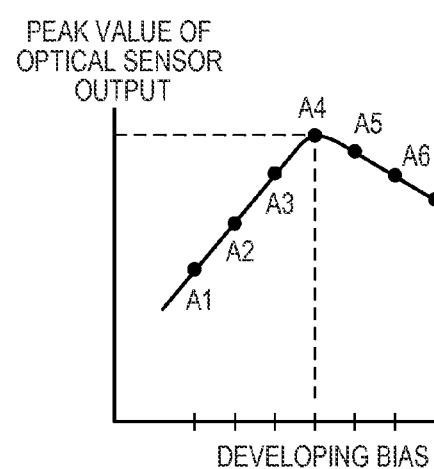
Figure 11C:
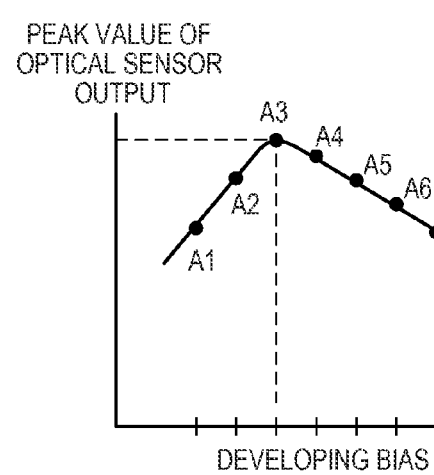

Among the peak values of the output signal when the pattern images 51 are detected by the optical sensor 27, the peak value is the highest when the duty ratio is 50%. Accordingly, the peak values of the output signal of the optical sensor 27 when the various pattern images 51 were detected are obtained, and the developing bias that was used when forming the pattern image 51 at which the peak value is the highest is set by the microcontroller 26 as the developing bias to be used after density correction. For example, if the relationship between the developing bias and the output of the optical sensor 27 shown in FIG. 11B is obtained, density correction is performed by setting the developing bias to the developing bias that was used when forming the pattern image 51 at the position A4. Thereafter, if the relationship between the developing bias used when forming the pattern image 51 and the output of the optical sensor 27 then changes to the relationship shown in FIG. 11C, density correction is performed by setting the developing bias to the developing bias that was used at the position A3.

Note that seven pattern images 51 are formed with different developing biases in FIG. 11A. Here, the time required for density control can be shortened by reducing the number of developing bias values that are used. However, in this case, it is possible for the highest value of the peak value of the output signal of the optical sensor 27 to not be able to be detected directly. In such a case, the developing bias at which the peak value of the output signal of the optical sensor 27 is the highest can be specified by linear interpolation, as will be described below with reference to FIGS. 14A and 14B.

Figure 14A:
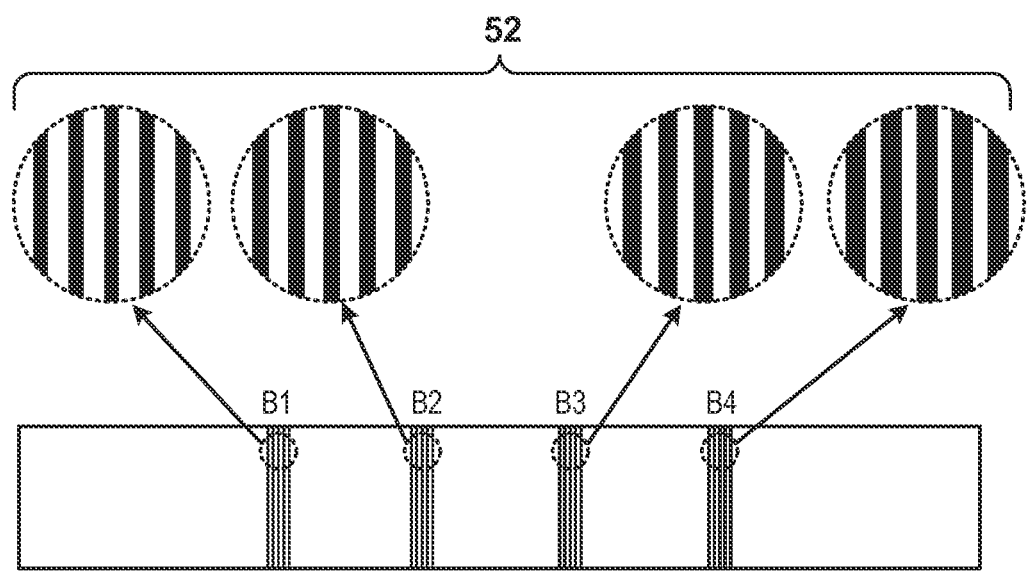
FIGS. 14A and 14B are diagrams for describing developing bias determination according to an embodiment.

FIG. 14A shows pattern images 52 that are formed when performing density correction during print processing. In FIG. 14A, the pattern image 52 includes 5 lines, and this pattern image 52 is formed four times in the non-transfer region. In this case as well, the developing bias is changed in a stepwise manner when forming the pattern images 52 at positions B1 to B4. Note that in FIG. 14A, the developing bias is the lowest at the position B1, and the developing bias is thereafter successively increased, with the developing bias being the highest at the position B4.

Figure 14B:
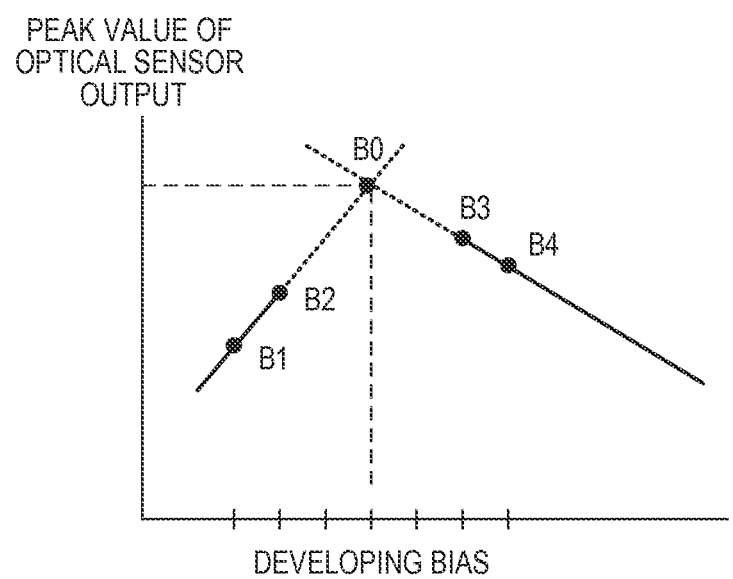

As shown in FIG. 14B, the peak value of the output signal of the optical sensor 27 is higher when the pattern image 52 at the position B2 is detected than when the pattern image 52 at the position B1 is detected. Also, the peak value of the output signal of the optical sensor 27 is higher when the pattern image 52 at the position B3 is detected than when the pattern image 52 at the position B4 is detected. Accordingly, it is understood that the peak value of the output signal of the optical sensor 27 is the highest at a developing bias that is between the developing bias used when forming the pattern image 52 at the position B2 and the developing bias used when forming the pattern image 52 at the position B3.

Here, the developing bias and the peak value of the output signal of the optical sensor 27 are in proportional relationships in the increasing range and decreasing range. Accordingly, linear interpolation is performed on the peak values of the output signal of the optical sensor 27 and the developing biases used when forming the pattern image 52 at the positions B1 and B2, as shown in FIG. 14B. Similarly, linear interpolation is performed on the peak values of the output signal of the optical sensor 27 and the developing biases used when forming the pattern image 52 at the positions B3 and B4. An intersection B0 between the linear interpolations is then obtained. The developing bias that corresponds to the obtained intersection B0 is the developing bias at which the peak value of the output signal of the optical sensor 27 is the highest.

Note that the pattern image 52 has five lines, and this is because when there are five lines, the peak value of the output of the optical sensor 27 consecutively appears multiple times as shown in FIG. 4, and therefore it is possible to reduce the signal noise component by averaging the peak values. Also, as image formation conditions related to density in the above-described embodiment, the laser light power is controlled before printing, and the developing bias is controlled during printing. Both of these types of control are for controlling the developing contrast, which is the difference between the developing bias and the potential at the position where the electrostatic latent image is formed on the photosensitive member 1. Accordingly, a mode is possible in which any value for changing the developing contrast is controlled before printing and during printing.

Furthermore, in the present embodiment, density control is performed with the line width at which the duty ratio is 50% serving as a reference. Accordingly, the highest value of the peak value of the output signal of the optical sensor 27 is set as a target value, and the developing contrast is controlled such that the peak value of the output signal of the optical sensor 27 is the target value. However, the target value can be a line width at which a predetermined duty ratio is achieved. In this case, the developing contrast is controlled using the peak value of the output signal of the optical sensor 27 that corresponds to the target line width as the target value. Note that according to FIG. 5, there are two duty ratios that correspond to the target value if the target duty ratio is not 50%, and the control unit 25 can specify which of them is the duty ratio of the pattern image that was detected by the optical sensor 27 based on the position that corresponds to the highest value. Also, in the present embodiment, the specular reflection image of the pattern image is double-sized at the location of the light receiving unit 270. However, any scale factor may be used as long as the pitch of the lines in the specular reflection image of the pattern image that appears at the location of the light receiving unit 270 is equal to the pitch of the light receiving units An and the pitch of the light receiving units Ap.

Also, although the above embodiment describes the case where the lines in the detection image 40 extend in a direction that is orthogonal to the movement direction of the intermediate transfer belt 8, the lines may extend at an angle to the orthogonal direction, or example. In other words, the detection image 40 need only be an image in which the amount of toner (amount of developer) changes regularly in the movement direction of the intermediate transfer belt 8, and the detection image 40 can include lines that extend in a direction that is different from the movement direction of the detection image 40.

According to the above configuration, it is possible to form detection images in a non-transfer region and execute calibration. The pattern images 40, 51, and 52 used in the present embodiment are striped patterns including stripes of very small widths, and it is possible to prevent the underside smearing of recording materials.

Second Embodiment

In the first embodiment, the 1-dot toner image diameter is 85 μm, which is substantially equal to the line width that is to be formed. However, the 1-dot toner image diameter differs from product to product due to various factors in the image forming apparatus. The present embodiment describes the case in which the 1-dot toner image diameter is greater than the line width that is to be formed. It is assumed that the 1-dot toner image diameter is 100 μm in the following description. Note that other portions will not be described since they are similar to the first embodiment.

Figure 8A:
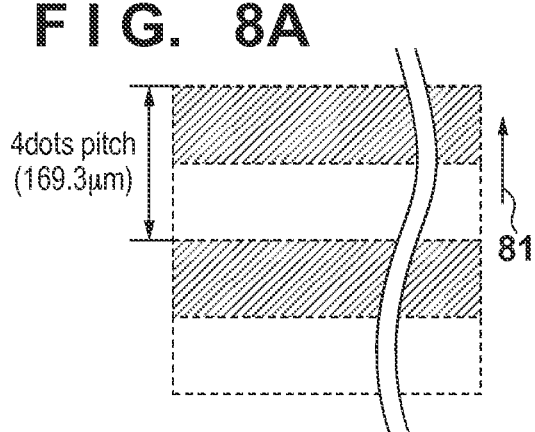
FIGS. 8A to 8H are diagrams for describing a pattern image formation method according to an embodiment.
Figure 8B:
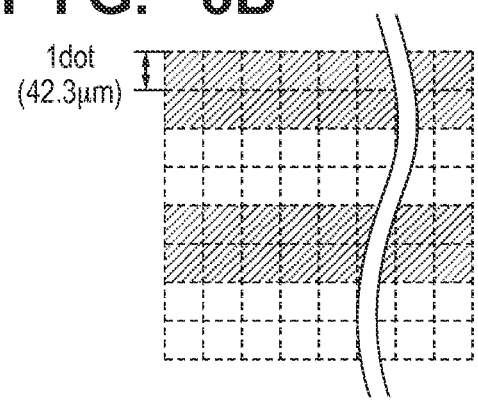
Figure 8C:
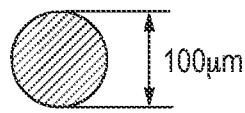
Figure 8D:
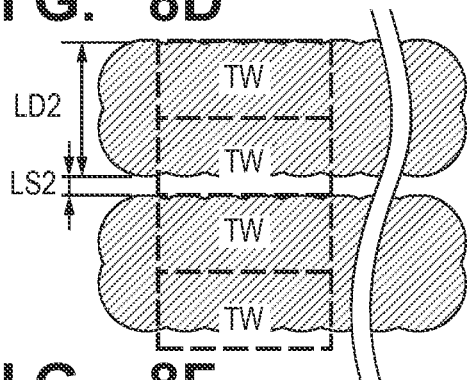
Figure 8E:
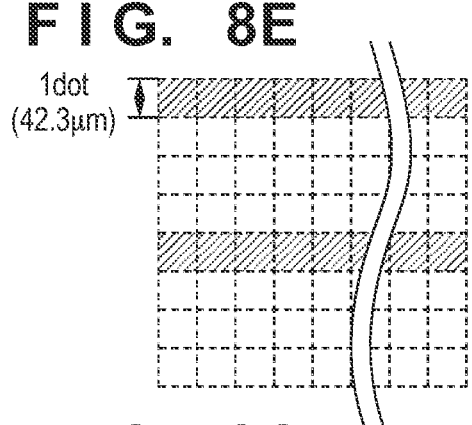
Figure 8F:
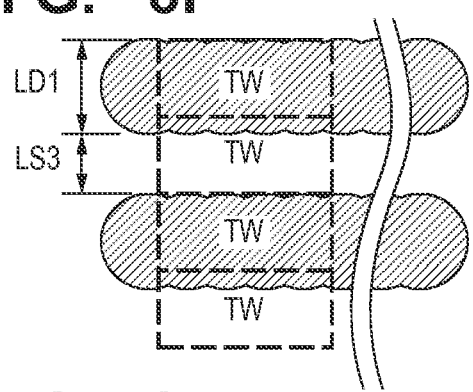
Figure 8G:
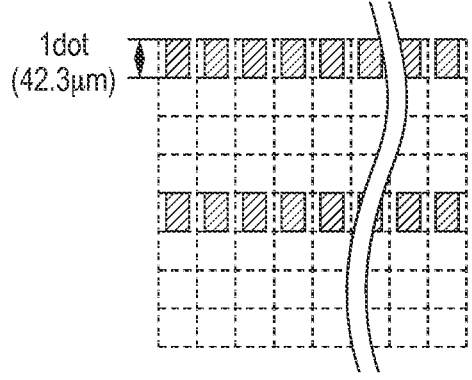
Figure 8H:
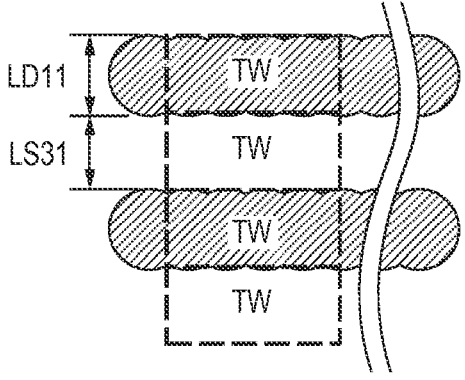

FIGS. 8A and 8B are the same as FIGS. 6A and 6B. FIG. 8C shows a 1-dot toner image of the present embodiment, and the diameter thereof is approximately 100 μm. FIG. 8D shows a toner image formed using image data in which the lines and spaces are made up of 2 dots. As shown in FIG. 8D, the line width LD2 is wider than the target line width Tw, and the space width LS2 is narrower than the target space width Tw. FIG. 8E shows image data in which one line is made up of 1 dot and one space is made up of 3 dots, and FIG. 8F shows a toner image formed using the image data shown in FIG. 8E. As shown in FIG. 8C, since the 1-dot toner image diameter is 100 μm, the line width LD1 that is formed is also 100 μm, which is wider than the target line width Tw=84.6 μm. In other words, the duty ratio is not 50%. In view of this, in the present embodiment, the duty ratio is adjusted so as to be 50% by reducing the density of the pixel data for each pixel forming the line, as shown in FIG. 8G. Specifically, the laser scan time for each pixel can be adjusted in multiple steps through PWM control, and the 1-dot toner image diameter can be set to substantially 85 μm by defining the scan time for each pixel. FIG. 8H shows a toner image formed using the image data shown in FIG. 8G. As shown in FIG. 8G, the density of the pixels that correspond to the line is reduced such that the scan time is reduced and the toner image diameter is set to substantially 85 μm, thus making it possible for LD11 to be made substantially equal to the target line width of 84.6 μm.

The above describes a method of setting the ratio of lines to spaces in the toner image to 50:50 by adjusting the laser light exposure intensity in the case where the 1-dot toner image diameter is 100 μm. However, even when the ratio of approximately 50:50 is achieved with lines made up of M dots and spaces made up of (M+3) dots, it is possible further finely adjust the laser light exposure intensity so as to achieve the ratio of 50:50.

Third Embodiment

In the first embodiment and the second embodiment, a pattern image having a duty ratio of substantially 50% is formed using image data for forming lines with a 1-dot width. However, the image data may be image data for forming lines with a width of multiple dots. The present embodiment describes the case of using image data for forming lines with a 2-dot width. Other portions will not be described since they are similar to the first embodiment.

Figure 12A:
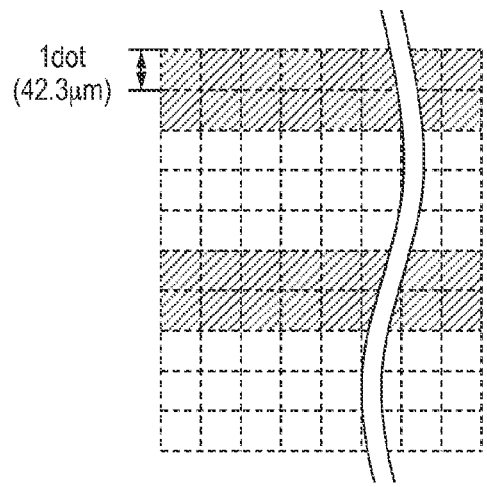
FIGS. 12A to 12E are diagrams for describing a pattern image formation method according to an embodiment.
Figure 12B:
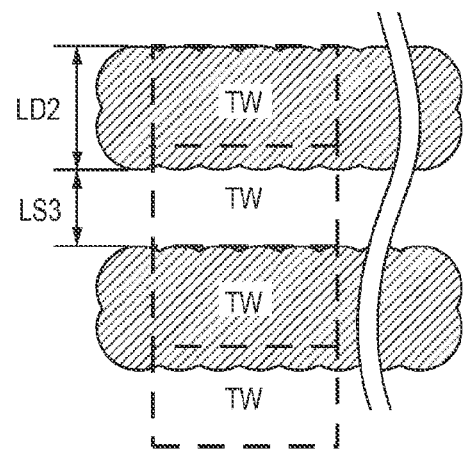
Figure 12C:
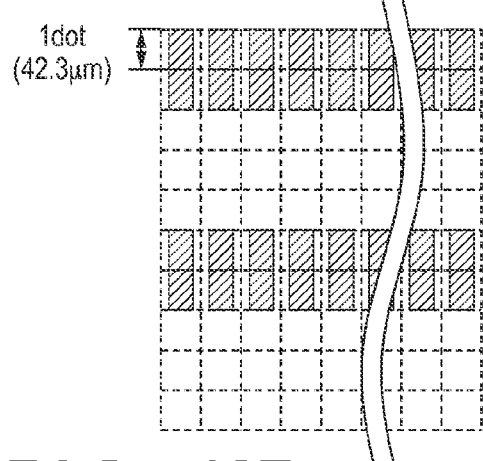
Figure 12D:
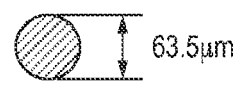
Figure 12E:
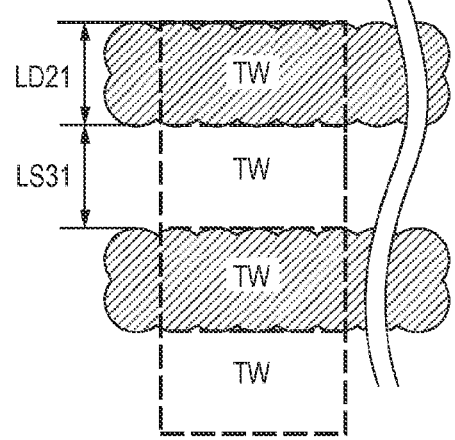

FIG. 12A shows image data in which the line width is 2 dots and the space width is 3 dots, and FIG. 12B shows a pattern image formed using the image data shown in FIG. 12A. Note that the diameter of a 1-dot toner image is 85 μm. As shown in FIG. 12B, LD2 is wider than the target line width Tw, which is 105.75 μm (equal to 2.5 dots) in the present example. Accordingly, in the present embodiment, as shown in FIG. 12C, the image data that is used is image data in which the density is reduced by reducing the scan time for the pixels that make up the line. FIG. 12D shows the diameter of a toner image formed by the image data for the pixels making up the line shown in FIG. 12C. According to the image data shown in FIG. 12C, the 1-dot toner image diameter is 63.5 μm as shown in FIG. 12D. FIG. 12E shows the pattern image that is formed using the image data shown in FIG. 12C. In FIG. 12E, the line width LD21 and the space width LS31 are both approximately 105.8 μm, which is substantially equal to the target width TW. As described above, it is possible to form a pattern image with a duty ratio of substantially 50% even if the line width is 2 dots or more in the image data.

Figure 13A:
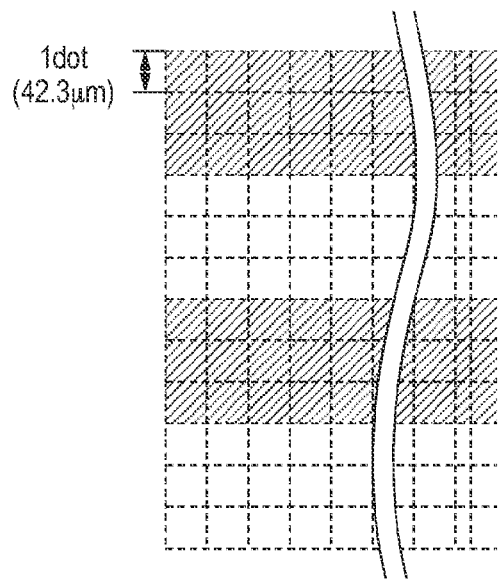
FIGS. 13A to 13D are diagrams for describing a pattern image formed by image data including M dots and M spaces.
Figure 13B:
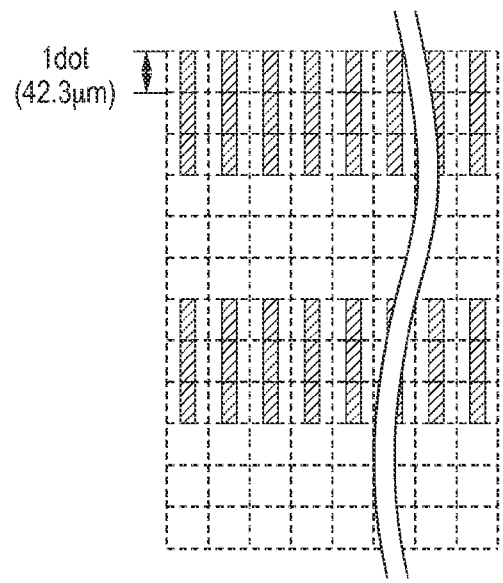
Figure 13C:
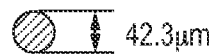
Figure 13D:
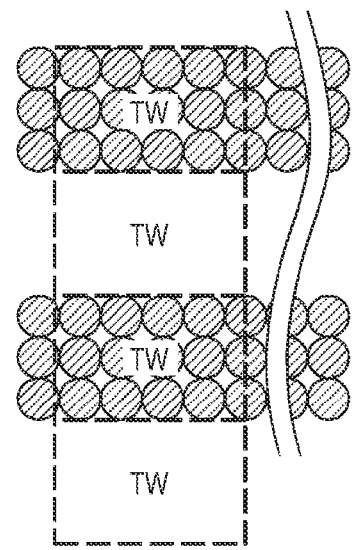

Note that with image data including M-dot (M being a natural number) lines and M-dot spaces, it is difficult to obtain a pattern image with a duty ratio of 50% even if the microcontroller 26 controls the laser light power, and the reason for this will be described below. FIG. 13A shows image data including lines with a 3-dot width and spaces with a 3-dot width. As has already been described, the line width of the pattern image that is to be formed is wide in the image data shown in FIG. 13A, and therefore the image data that is used is image data in which the density is reduced for the pixels that make up the line as shown in FIG. 13B. Here, in order to make the duty ratio substantially 50%, the toner image dot diameter needs to be reduced to approximately 42.3 μm as shown in FIG. 13C. FIG. 13D shows the pattern image that is formed using the image data shown in FIG. 13B. As shown in FIG. 13D, since the toner image dot diameter is too small, gaps appear between the dots in the toner image. These gaps cause a reduction in the amplitude of the output signal of the optical sensor 27. Conversely, the line width is too wide if the pixel density is adjusted such that the dot diameter does not allow gaps to appear.

As set forth above, the image data for forming a pattern image having a duty ratio of 50% needs to be image data according to which the line width is smaller than the space width.

Note that the line width of the pattern image need only be set so as to enable the detection of very small variations in the line and space widths, and the dot width may be set higher than the dot width used in the above-described embodiments. However, if the line and space widths are too wide, the dynamic range with respect to vary small variation in width decreases, and therefore the line and space widths are set within a reasonable range of up to approximately 10 dots, for example.

Fourth Embodiment

Next, a fourth embodiment will be described. Note that the image forming apparatus, the optical sensor, the control circuit of the optical sensor, and the like are similar to those in the first embodiment.

Figure 17:
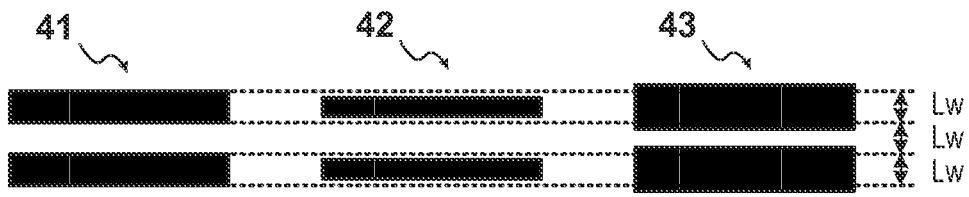
FIG. 17 is a diagram showing a pattern image according to an embodiment.

FIG. 17 shows three types of pattern images having different line widths. Each pattern image is made up of two lines. Note that a width Lw indicated by broken lines in FIG. 17 is the target line width and space width that are to be achieved. Here, the target line width Lw is half of the width Wsns of the light receiving elements 273 and 274, and is 127 μm, for example. Also, the target line pitch (2Lw) is half of the pitch Psns of the light receiving elements 273 and 274. In other words, at the location where the light receiving unit 270 is arranged, if the widths of the light regions and dark regions formed by the pattern image (widths in the movement direction of the pattern image) are equal to the width Wsns of the light receiving elements 273 and 274, the line width of the pattern image is the target line width.

The pitches of the lines in the pattern images 41, 42, and 43 in FIG. 17 are all 2Lw, which is the target line pitch, and the line width is different for each of the pattern images. Specifically, the line width of the pattern image 41 is equal to the target line width Lw. However, the line width of the pattern image 42 is 101.6 μm, which is a factor of 0.8 of the target line width Lw, and the line width of the pattern image 43 is 152.4 µm, which is a factor of 1.2 of the target line width Lw.

Figure 18:
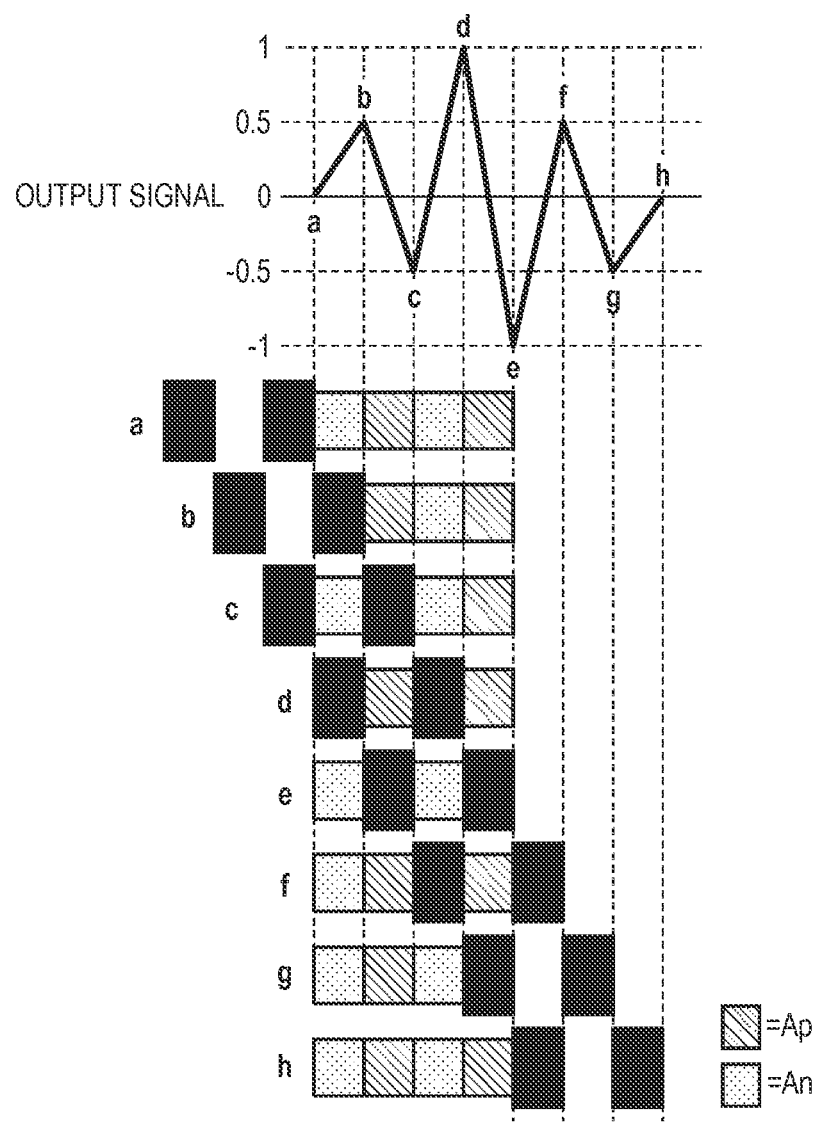
FIG. 18 is a diagram showing the output signal of the optical sensor in the case of detecting a pattern image whose line width is the same as the target line width, according to an embodiment.

FIG. 18 shows an output signal of the optical sensor 27 when the pattern image 41 in FIG. 17 is detected. Note that the positional relationship between the light receiving unit 270 and the shadows that appear due to the lines in the pattern image 41 and move in accordance with the movement of the pattern image 41 is shown below the output signal. It should also be noted that the output signal is normalized such that the value thereof is "0" at the reference voltage Vref2, that is to say, when the total amount of light received by the light receiving units Ap and the total amount of light received by the light receiving units An are the same, and such that the highest value of the output signal is "1".

State a is a state in which the line shadows do not cover any of the light receiving units Ap and An. In this case, the total amount of light received by the light receiving units Ap and the total amount of light received by the light receiving units An are the same, and thus the output of the optical sensor 27 is "0". State b is a state in which a line shadow covers one light receiving unit An. In this case, the total amount of light received by the light receiving units Ap is double the total amount of light received by the light receiving units An, and the output of the optical sensor 27 is "0.5". State c is, conversely to the state b, a state in which a line shadow covers one light receiving unit Ap. In this case, the total amount of light received by the light receiving units An is double the total amount of light received by the light receiving units Ap, and the output of the optical sensor 27 is "−0.5". State d is a state in which line shadows cover all of the light receiving units An. In this case, the total amount of light received by the light receiving units An is substantially "0", and the output of the optical sensor 27 is "1.0". State e is, conversely to the state d, a state in which line shadows cover all of the light receiving units Ap. In this case, the total amount of light received by the light receiving units Ap is substantially "0", and the output of the optical sensor 27 is "−1.0". As the pattern image 41 subsequently moves, the line shadows change to the states f, g, and h, and the output of the optical sensor 27 changes to "0.5", "−0.5", and "0".

Figure 19:
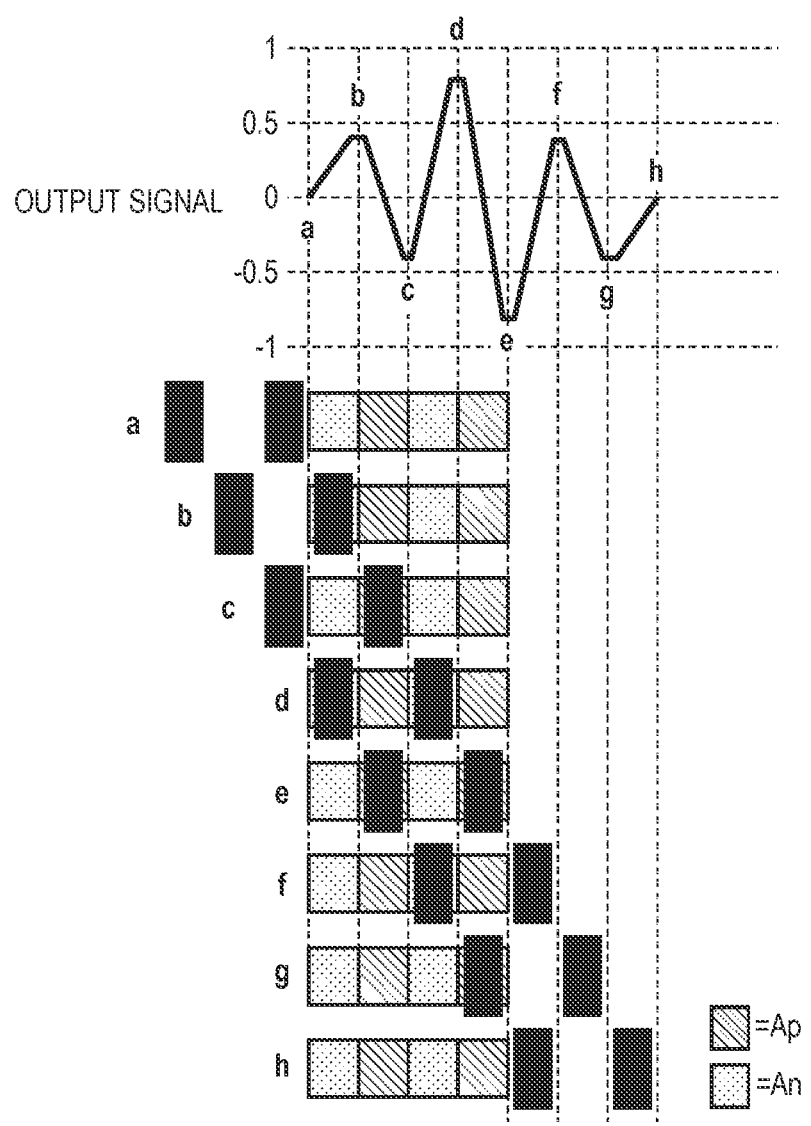
FIG. 19 is a diagram showing the output signal of the optical sensor in the case of detecting a pattern image whose line width is narrower than the target line width, according to an embodiment.

An output signal of the optical sensor 27 when the pattern image 42 in FIG. 17 is detected is shown in FIG. 19 with notation similar to that in FIG. 18. Note that highest value in the output waveform is normalized such that the highest value when the pattern image 41 is detected is "1". As shown in FIG. 19, the line width of the pattern image 42 is a factor of 0.8 of the target line width, and therefore the shadows are narrower than the widths of the light receiving units Ap and An, and the shadows formed by the lines do not entirely cover the light receiving units Ap or the light receiving units An. Accordingly, the decrease in the amount of received light due to being covered by a shadow is lower than the case where the pattern image 41 shown in FIG. 18 is detected. Accordingly, even in the states d and e having the highest difference between the total amount of light received by the light receiving units Ap and the total amount of light received by the light receiving units An, those differences are lower than in the states d and e shown in FIG. 18. Specifically, the peak value of the output signal of the optical sensor 27 when the pattern image 42 is detected is a factor of 0.8 of the peak value of the output signal of the optical sensor 27 when the pattern image 41 is detected. Here, the ratio of the line widths of the pattern image 41 and the pattern image 42 is shown below.

127 µm:101.6 µm=1:0.8

In other words, the peak value of the output signal of the optical sensor 27 decreases in proportion to a decrease in the line width below the target value.

Figure 20:
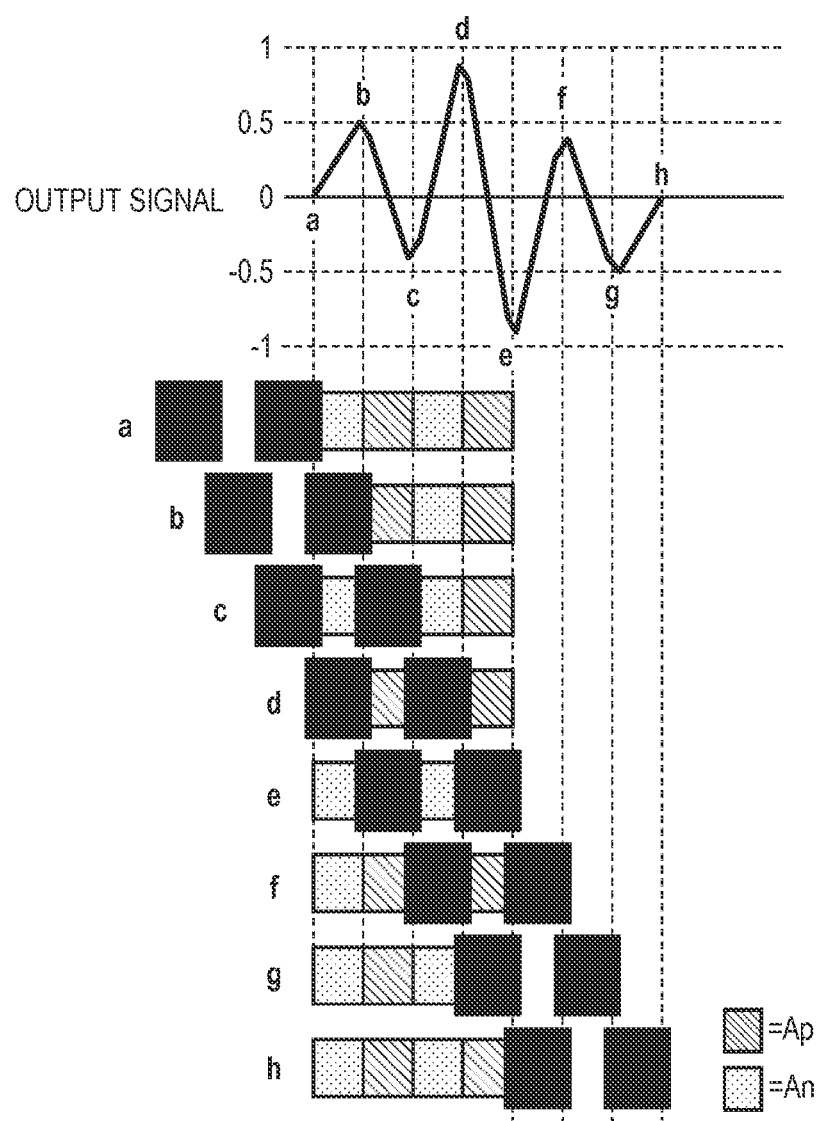
FIG. 20 is a diagram showing the output signal of the optical sensor in the case of detecting a pattern image whose line width is wider than the target line width, according to an embodiment.

An output signal of the optical sensor 27 when the pattern image 43 in FIG. 17 is detected is shown in FIG. 20 with notation similar to that in FIG. 19. As shown in FIG. 20, the line width of the pattern image 43 is a factor of 1.2 of the target line width, and therefore the shadows are wider than the widths of the light receiving units Ap and the light receiving units An. Accordingly, even in the states d and e having the highest difference between the total amount of light received by the light receiving units Ap and the total amount of light received by the light receiving units An, those differences are lower than in the states d and e shown in FIG. 18. This is because in the state d, the line shadows cover not only the light receiving units An, but also the light receiving units Ap, and in the state e, the line shadows cover not only the light receiving units Ap, but also the light receiving units An. Specifically, the peak value of the output signal of the optical sensor 27 when the pattern image 43 is detected is a factor of 0.9 of the peak value of the output signal of the optical sensor 27 when the pattern image 41 is detected. Note that timing of the states d and e at which the sensor output is the highest in FIG. 20 is slightly different from the timing of the states d and e in FIG. 18.

Figure 21:
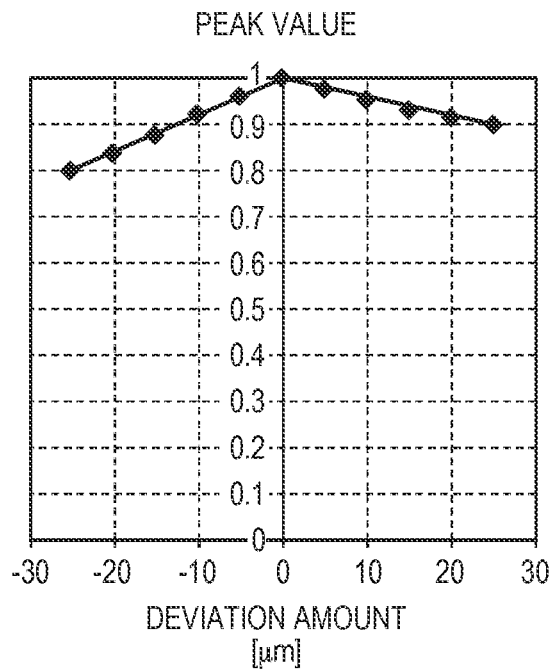
FIG. 21 is a diagram showing a relationship between the amount of deviation of the line width of the pattern image from a target value and the peak value of the output signal of the optical sensor.

As described above, light and dark regions are formed due to light from the light emitting element 272 being emitted onto the pattern image 40 formed with a predetermined line pitch, and the optical sensor 27 outputs a signal that varies in a manner centered about the reference voltage Vref2 as these light and dark regions move over the light receiving unit 270 due to the movement of the intermediate transfer belt 8. The peak value of this signal changes according to the line width of the pattern image 40. Specifically, the peak value of the output signal of the optical sensor 27 is the highest when the line width of a shadow formed by a line at the location of the light receiving unit 270 is the same as the width of the light receiving units Ap and the light receiving units An. If the line width is narrower or wider than this, the peak value of the output signal of the optical sensor 27 decreases. FIG. 21 shows the relationship between the amount of deviation from the target line width and the peak value of the output signal of the optical sensor 27. Note that the peak value of the output signal of the optical sensor 27 is not dependent on the movement speed (rotation speed) of the intermediate transfer belt 8.

Figure 22:
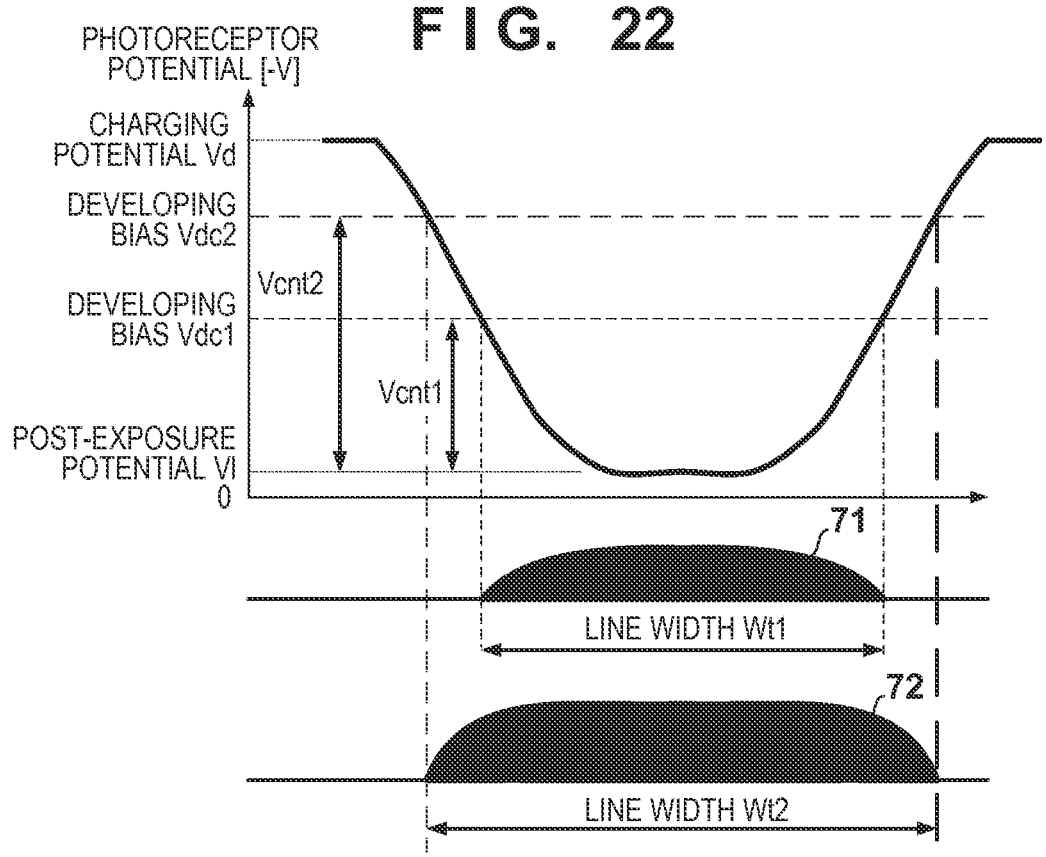
FIG. 22 is a diagram for describing a relationship between the line width of a pattern image and the developing bias.

Next, the formation of the pattern image 40 will be described. FIG. 22 shows a potential distribution in the line width direction when an electrostatic latent image made up of one line in the main scanning direction is formed on the photosensitive member 1. Note that the vertical axis in the graph shown in FIG. 22 represents negative potential. The amount of laser light has an intensity distribution that attenuates outward from the center. For this reason, when the electrostatic latent image is formed by laser light on the charged photosensitive member 1, the potential of the photosensitive member 1 in the edge portion of the electrostatic latent image gradually changes from a charging potential Vd to a post-exposure potential V1 as shown in the graph of FIG. 22. When this electrostatic latent image is developed using a developing bias Vdc1, a developing contrast Vcnt1 is obtained as shown below.

$$Vcnt1 = |Vdc1 - V1|$$

Since the toner is developed so as to fill the electrostatic latent image with this developing contrast, if developing is performed with the developing bias Vdc1, a toner image having the line width Wt1 is formed as shown by a toner image 71 shown in FIG. 22.

Similarly, if developing is performed with a developing bias Vdc2 that is higher than the developing bias Vdc1 on the negative side, a developing contrast Vcnt2 is obtained as shown below.

$$Vcnt2=|Vdc2-V1|$$

Accordingly, if developing is performed with the developing bias Vdc2, a toner image having the line width Wt2 is formed as shown by a toner image 72 shown in FIG. 22.

Figure 23A:
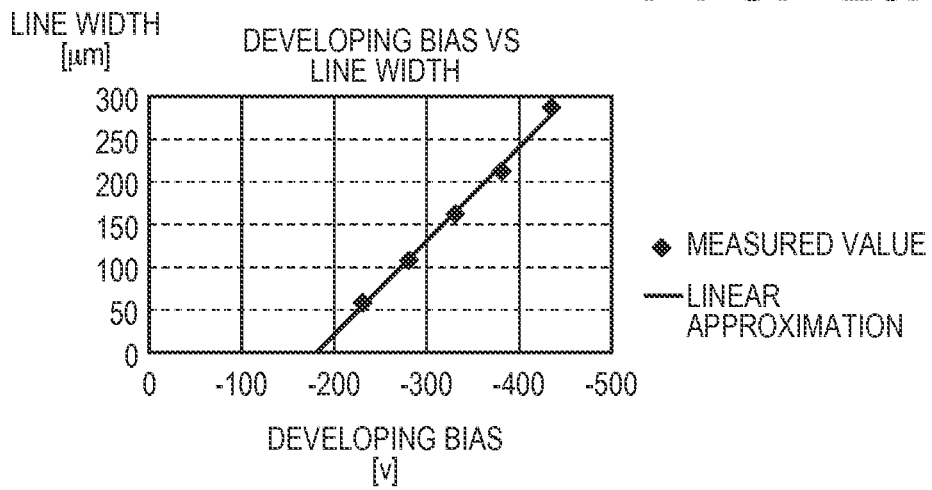
FIGS. 23A to 23C are diagrams showing various relationships between the developing bias, the line width of a pattern image, and the highest density.
Figure 23B:
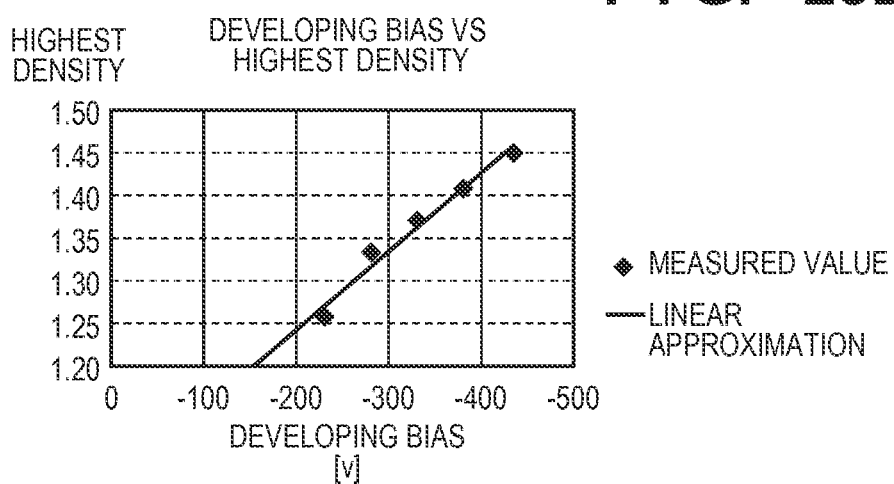
Figure 23C:
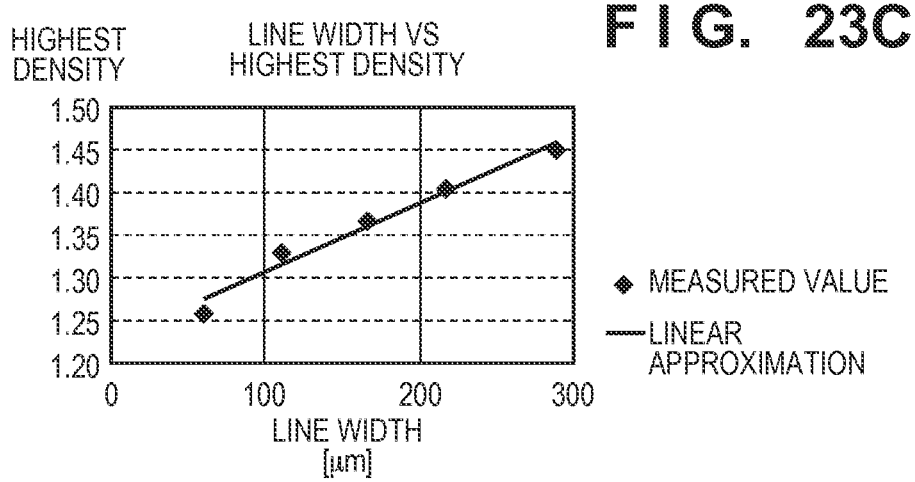

Accordingly, as the developing contrast is raised, the line width increases, and the developing density becomes darker. FIG. 23A shows results of measuring change in the line width when the developing bias is varied, and FIG. 23B shows results of measuring change in the highest density when the developing bias is varied. As shown in FIGS. 23A and 23B, the line width and the highest density are in a proportional relationship with the developing bias. Also, FIG. 23C shows the relationship between the line width and the highest density derived from the measurement results in FIGS. 23A and 23B. As shown in FIG. 23C, the line width and the highest density are in a substantially direct proportional relationship. Accordingly, the highest density can be controlled by controlling the line width.

The following describes highest density calibration in the present embodiment. In the present embodiment, two types of calibration are executed, namely initial highest density calibration that is performed in an initial state such as when the power is turned on, and mid-printing highest density calibration that is performed in order to deal with the fact that the highest density changes little-by-little during printing. Note that one reason for changes in the highest density during printing is thought to be that when the temperature of the photosensitive member 1 changes due to successive printing, the resistance value of the photosensitive member 1 changes, and this causes a change in the charge leak amount of the photosensitive member 1, thus changing the latent image potential.

Initial Highest Density Calibration

Figure 24:
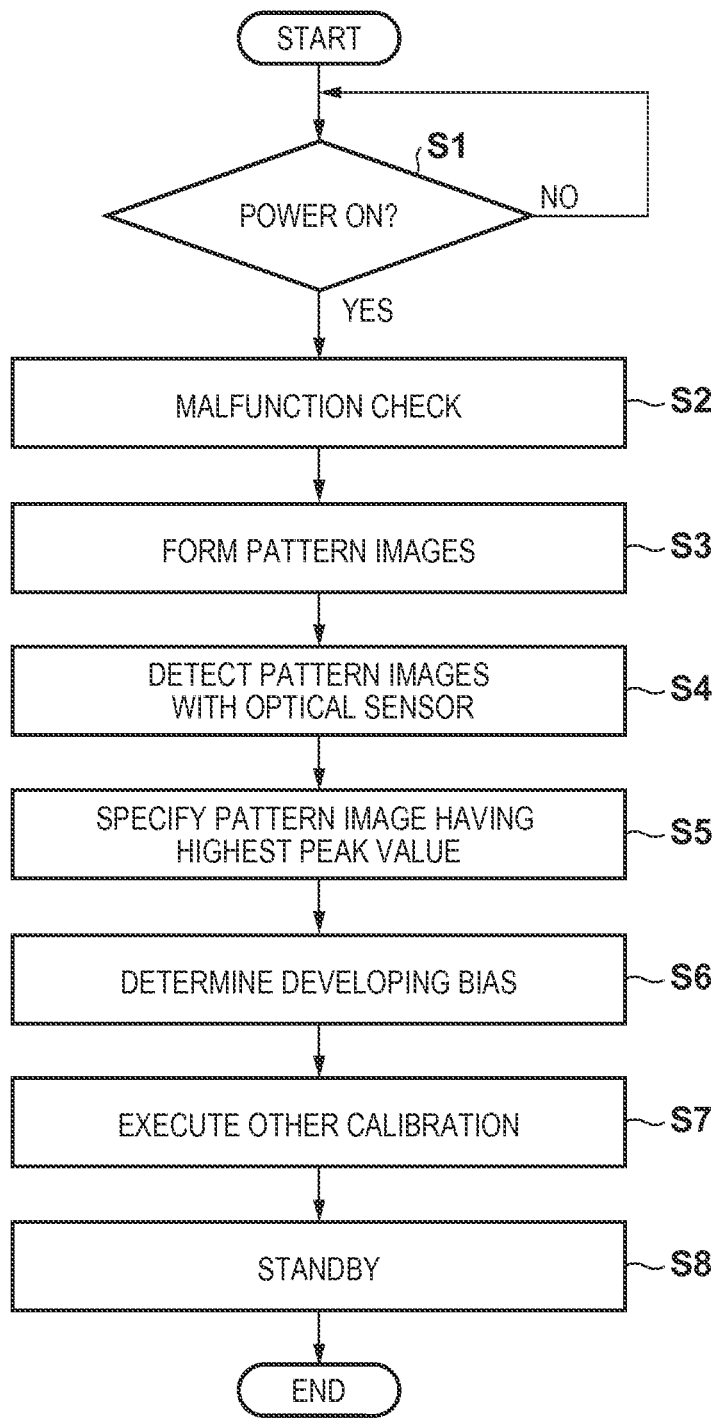
FIG. 24 is a flowchart of initial highest density calibration according to an embodiment.
Figure 25:
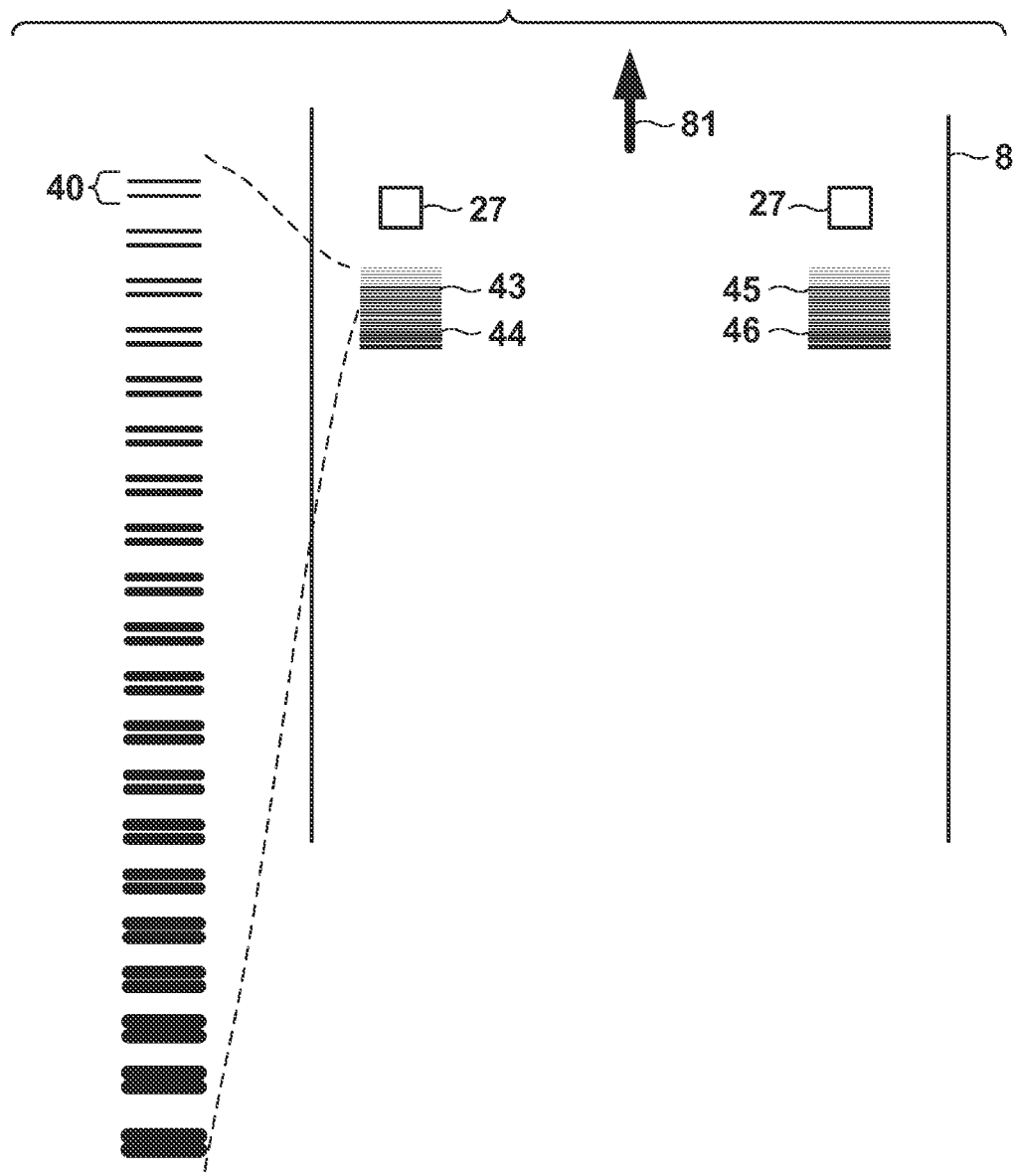
FIG. 25 is a diagram schematically showing a pattern image used in initial highest density calibration according to an embodiment.

Initial highest density calibration of the present embodiment will be described below with reference to the flowchart of FIG. 24. When the power of the image forming apparatus 101 is turned on in step S1, the control unit 25 performs a malfunction check on the image forming apparatus 101 in step S2. Next, in step S3, the control unit 25 forms pattern images 43 to 46 for initial highest density calibration shown in FIG. 25 on the intermediate transfer belt 8. Note that the pattern images 43 to 46 are respectively formed using yellow, magenta, cyan, and black toner, but are all the same with the exception of their color. Note that in FIG. 25, an optical sensor 27 is provided on each side in a direction that is orthogonal to the movement direction 81 of the intermediate transfer belt 8, the pattern images 43 and 44 are provided on one side in this direction, and the pattern images 45 and 46 are provided on the other side in this direction. However, this is merely one example, and any number of optical sensors 27 can be used. Also, although FIG. 25 shows details regarding the pattern image 43 formed using yellow toner as a representative example, the pattern images for the other colors are similar to the pattern image 43. Here, the pattern image 43 includes multiple pattern images 40 that each includes two lines as shown in FIG. 2. Note that the developing bias is gradually changed when forming the respective pattern images 40. In the present embodiment, one pattern image 43 includes 20 pattern images 40, the first pattern image 40 is formed using a developing bias of −280 V, and the subsequent pattern images 40 are formed using a developing bias successively changed by −5 V until −375 V is reached.

Figure 26:
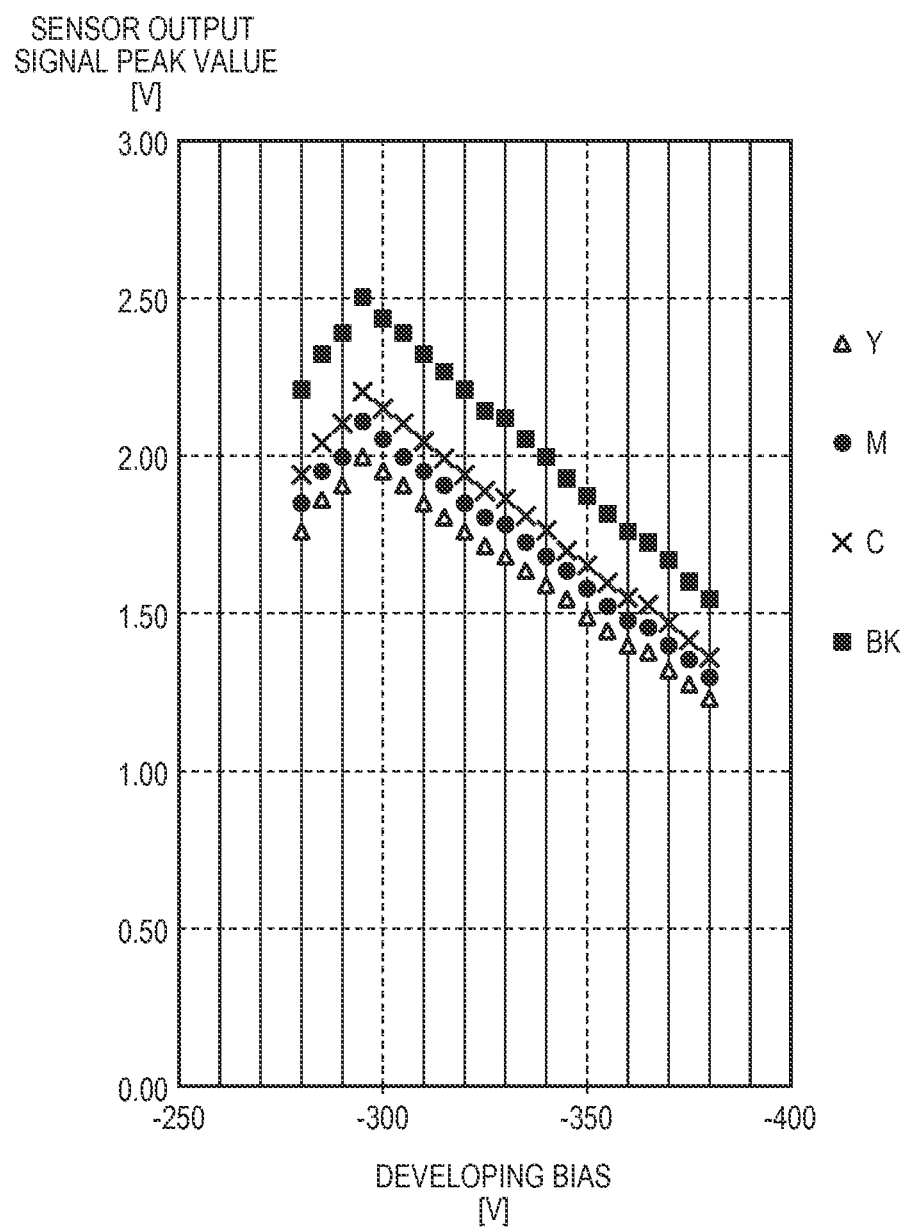
FIG. 26 is a diagram showing a relationship between the developing bias detected in initial highest density calibration and the peak value of the output signal of the optical sensor according to an embodiment.

In step S4, the control unit 25 detects the formed pattern images 43 to 46 using the optical sensors 27. Here, the graph indicated by Y in FIG. 26 is obtained by plotting the relationship between the developing bias used when forming the pattern image 40 and the peak value of the output of the optical sensor 27 when detecting the pattern image, for each of the pattern images 40 included in the pattern image 43. Similarly, the graphs indicated by M, C, and Bk in FIG. 26 are obtained for the pattern images 44 to 46. The corresponding data is saved in a storage unit (not shown), and in step S5, the control unit 25 specifies the pattern image 40 that corresponds to the highest value among the 20 peak values for each color in the graphs shown in FIG. 26. Then, in step S6, the developing bias that was used when forming the specified pattern image 40 for each color is set as the developing bias to be used for that color. Thereafter, in step S7, the control unit 25 executes other types of calibration such as density/gradation calibration and color shift calibration, and then the standby state is entered in step S8. Note that in steps S5 and S6, pattern images 40 that were actually formed are detected by the optical sensors 27, the peak values of the corresponding output signals are measured, and the developing bias that was used when forming the pattern image 40 having the highest peak value is specified. However, a configuration is possible in which the results of measuring the peak value of the output signal are interpolated so as to obtain the relationship between the developing bias and the peak value of the output signal of the optical sensor 27, and the developing bias according to which the peak value of the output signal is the highest is specified based on the obtained relationship.

Mid-Printing Highest Density Calibration

Figure 27:
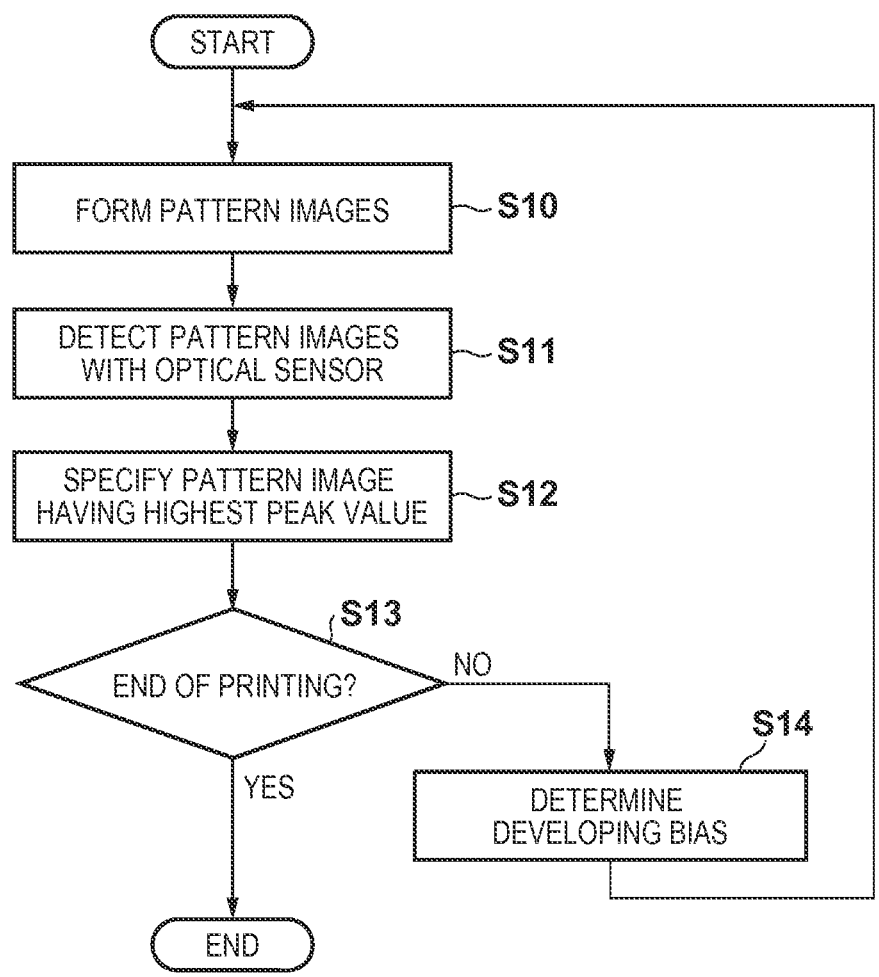
FIG. 27 is a flowchart of mid-printing highest density calibration according to an embodiment.

Next, mid-printing highest density calibration of the present embodiment will be described below with reference to the flowchart of FIG. 27. When performing successive printing in a general image forming apparatus, the conveying gap between recording materials to be printed on is approximately 70 mm, for example. Accordingly, a region where transfer to a recording material is not performed, which corresponds to the conveying gap between recording materials, exists on the intermediate transfer belt 8 between images that are to be transferred to recording materials. Hereinafter, this region on the intermediate transfer belt 8 that corresponds to the gap between recording materials will be referred to as the non-transfer region. In the present embodiment, this non-transfer region is used to execute calibration during printing.

Figure 28:
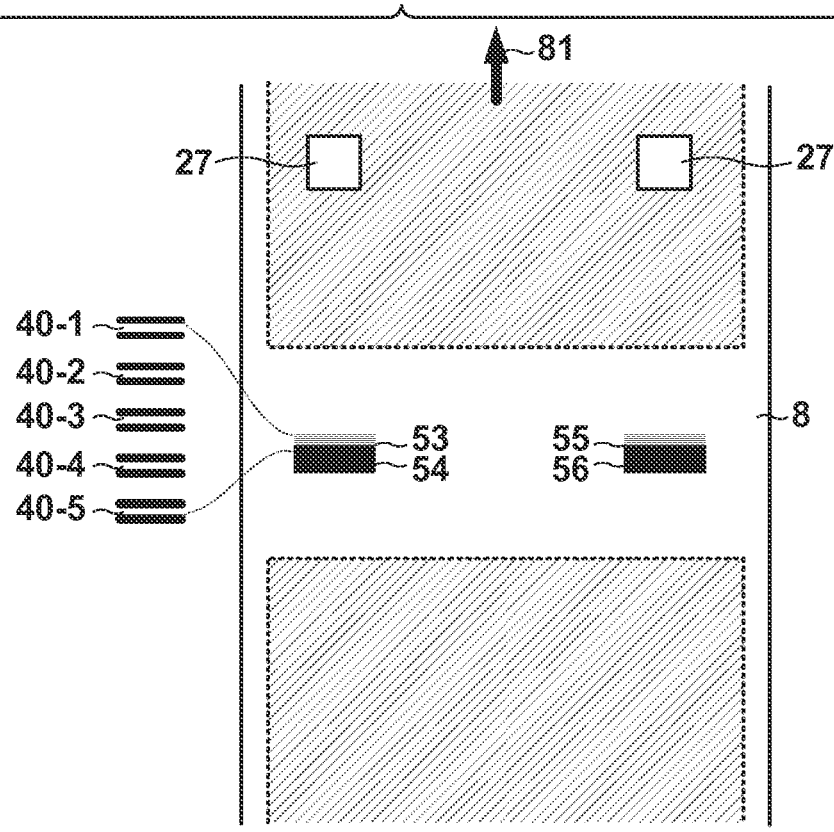
FIG. 28 is a diagram schematically showing a pattern image used in mid-printing highest density calibration according to an embodiment.

When the mid-printing highest density calibration starts, in step S10, the control unit 25 forms pattern images 53 to 56 for mid-printing highest density calibration shown in FIG. 28 in the non-transfer region of the intermediate transfer belt 8. Note that in FIG. 28, the shaded regions are regions for the formation of images that are to be transferred to a recording material in secondary transfer, and the region between the shaded regions is the non-transfer region. Note that the pattern images 53 to 56 are respectively formed using yellow, magenta, cyan, and black toner, but are all the same with the exception of their color. Also, any number of optical sensors 27 can be used. Furthermore, although FIG. 28 shows details regarding the pattern image 53 formed using yellow toner as a representative example, the pattern images for the other colors are similar to the pattern image 53. Here, the pattern image 53 includes multiple pattern images 40 that each include two lines as shown in FIG. 2. Note that the developing bias is gradually changed when forming the respective pattern images 40. Specifically, the developing bias that is to be used is the current setting value and values obtained by adding/subtracting a predetermined value to/from the current setting value. In the present embodiment, pattern images 40-1 to 40-5 are respectively formed using "current setting value +10 V", "current setting value +5 V", "current setting value", "current setting value −5 V", and current setting value −10 V". Note that there is no limitation to each pattern image including five pattern images 40, and any number of pattern images 40 may be used.

Figure 29:
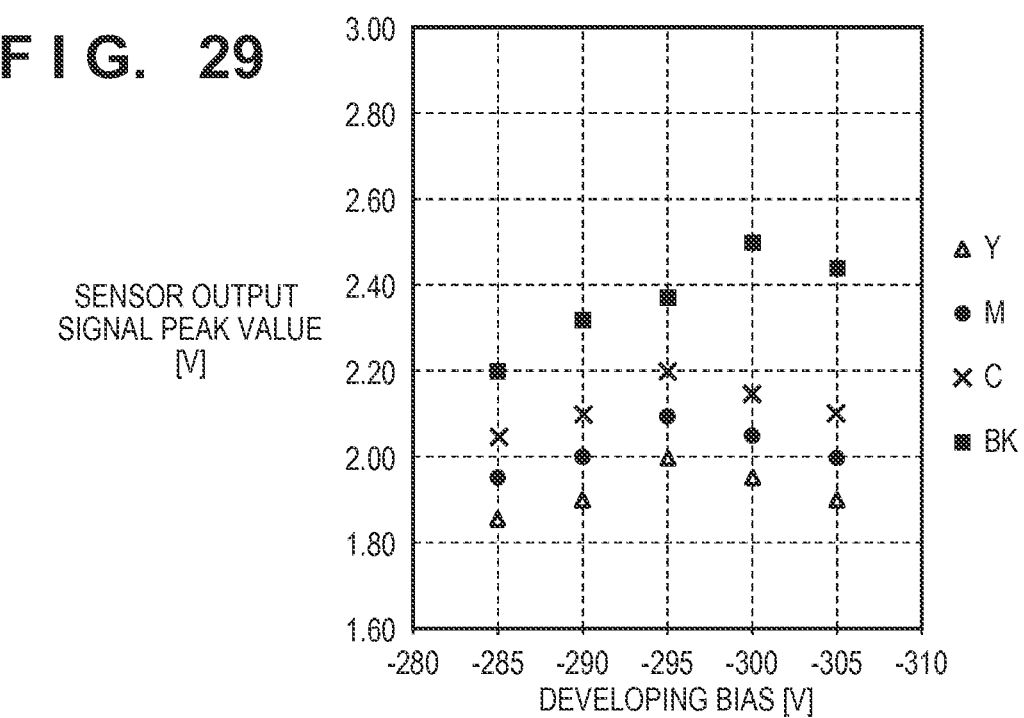
FIG. 29 is a diagram showing a relationship between the developing bias detected in mid-printing highest density calibration and the peak value of the output signal of the optical sensor according to an embodiment.

In step S11, the control unit 25 detects the formed pattern images 53 to 56 using the optical sensor 27. Here, the graph indicated by Y in FIG. 29 is obtained by plotting the relationship between the developing bias used when forming the pattern image 40 and the peak value of the output signal of the optical sensor 27 when detecting the pattern image, for each of the pattern images 40 included in the pattern image 53. Similarly, the graphs indicated by M, C, and Bk in FIG. 29 are obtained for the pattern images 54 to 56. In step S12, the control unit 25 specifies the pattern image 40 that corresponds to the highest value among the five peak values for each color according to the graphs shown in FIG. 29. Next, in step S13, the control unit 25 determines whether or not printing has ended, and if printing has not ended, in step S14 the control unit 25 sets, for each color, the developing bias that was used when forming the pattern image 40 that was specified in step S12, as the developing bias that is to actually be used. On the other hand, if printing has ended, this procedure ends without performing other processing. Note that similarly to the initial highest density calibration shown in FIG. 24, a configuration is possible in which the value of the developing bias that is to be set in step S14 is not determined based on the value of a developing bias that was used when actually forming a pattern image 40, but rather is obtained by interpolating the measurement results.

In an image forming apparatus in which mid-printing highest density calibration is not performed, the humidity and temperature of the photosensitive member and the like changes during successive printing, and this sometimes causes a gradual change in image density. In the present embodiment, performing mid-printing highest density calibration makes it possible to suppress change in the highest density by feeding back the highest density that changes from moment to moment.

As described above, density control can be performed using a pattern image whose line width is narrower than 1 mm by using the fact that the peak value of the amplitude of the output signal of the optical sensor 27 is the highest when the line width of the pattern image is a specific value determined by, for example, the width of the light receiving regions of the light receiving elements and the positional relationship with the light emitting element. Specifically, density control is performed by forming multiple pattern images with different developing biases and specifying the developing bias according which the peak value of the output signal of the optical sensor 27 is the highest value, which is the target value. This very small-sized pattern image enables inexpensively performing highly precise highest density calibration without using a CCD.

Also, since the pattern image is small-sized, the amount of toner used in calibration is reduced, thus making it possible to reduce the recovered amount of toner used in calibration. Furthermore, highest density calibration can be executed even during successive printing, thus making it possible to reduce differences in density during printing without temporarily stopping printing during successive printing.

Note that in the present embodiment, the optical sensor 27 is a reflective sensor that receives reflection light from the pattern image 40 formed on the intermediate transfer belt 8. However, the present invention is not limited to using a reflective sensor, and it can be realized with a transmissive sensor.

Also, in the above-described embodiment, the value of the developing bias is controlled and set as an image formation condition related to density. However, another image formation condition that changes the developing contrast may be controlled, such as the charging potential of the charging unit 2 or the exposure intensity of the exposing unit 7.

Also, the pattern image 40 of the above-described embodiment includes two lines. However, the pattern image may include three or more lines. For example, if a pattern image 40 including three lines is read by the optical sensor 27, a peak value will be output two times from the optical sensor 27. Reading variation of the optical sensor 27 can be reduced by calculating the average of these peak values. Also, the pattern image may include one line. In this case, a signal with an amplitude that corresponds to the line width is output two times. Furthermore, in the above-described embodiment, the optical sensor 27 has two light receiving units Ap and two light receiving units An. However, the optical sensor 27 may have three or more light receiving units Ap and three or more light receiving units An. Increasing the number of light receiving units Ap and light receiving units An increases the total area of the light receiving units Ap and the total area of the light receiving units An, thus making it possible to increase the amount of light received by the optical sensor 27.

Furthermore, if control is performed by employing only data at timings before and after the peak is obtained in the output signal information of the optical sensor 27, the present embodiment can be configured with one light receiving unit Ap and one light receiving unit An.

Note that in the above-described embodiment, the area and the width in the alignment direction of the light receiving regions of the light receiving units An and the light receiving units Ap is equal, and the length of the shadow formed by the pattern image in a direction orthogonal to the alignment direction is longer than the length of the light receiving units An and the light receiving units Ap in the same direction. These conditions are employed in order to obtain the same amount of received light when the light receiving units An and the light receiving units Ap are not influenced by the pattern image, and to obtain the same amount of reduction in the amount of received light when the light receiving units An and the light receiving units Ap are influenced by the pattern image. However, even if all of the above conditions are not satisfied, it would be obvious to a person skilled in the art to achieve the same amount of received light when there is no influence by the pattern image, and to obtain the same amount of reduction in the amount of received light due to the pattern image, and the present invention is not limited to the above conditions.

Furthermore, although the above embodiment is described taking the example in which the lines in the pattern image 40 are formed in a direction orthogonal to the movement direction of the intermediate transfer belt 8, the lines may extend at an angle to the orthogonal direction. In other words, the pattern image 40 need only be an image in which the amount of toner (amount of developer) changes regularly as the intermediate transfer belt 8 moves, and the pattern image 40 can include lines that extend in a direction that is different from the movement direction of the pattern image 40.

Fifth Embodiment

Figure 30:
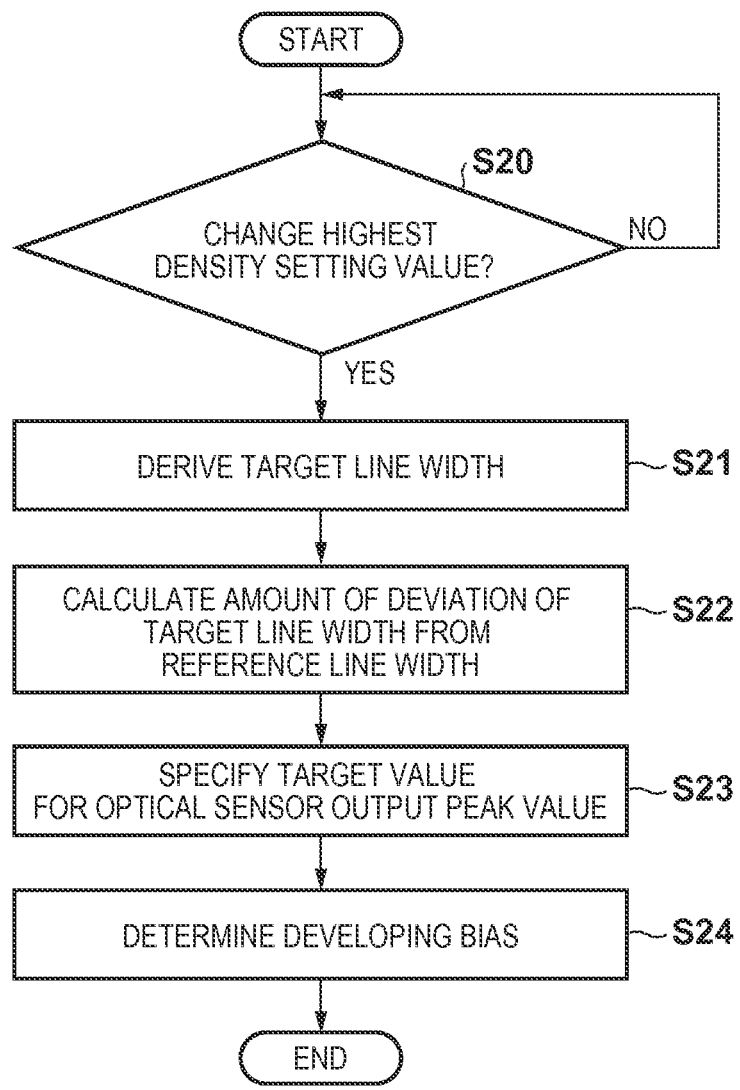
FIG. 30 is a flowchart of highest density setting change processing according to an embodiment.

In the fourth embodiment, the highest density is controlled by controlling the width of the shadows formed by the lines in the pattern image 40 so as to be the same as the width of the light receiving units Ap and the light receiving units An. For example, assuming that the width of the light receiving units Ap and the light receiving units An is 254 μm, the line width is adjusted so as to be 127 μm, and this results in the adjustment of the highest density to 1.32 according to FIG. 23C. In the present embodiment, the target line width of the pattern image 40 is a variable value, rather than being a fixed value that is determined by the width of the light receiving units Ap and the light receiving units An. Note that in the present embodiment, for each color, the user can select a setting value for the highest density from among a total of 11 options, namely "standard", "+1" to "+5", and "−1" to "−5". Also, the relationship between the highest density setting value and the target line width is obtained in advance as shown FIG. 31 and stored in a storage unit. Furthermore, the target line width when the highest density setting value is "standard" is set as the reference line width, and the relationship between the amount of deviation from the reference line width and the peak value of the output signal of the optical sensor is also obtained in advance as shown in FIG. 21 and stored in the storage unit. Moreover, it is assumed that the initial setting value for the highest density is "standard", the image forming apparatus 101 has already executed the initial highest density calibration shown in FIG. 24, and the data shown in FIG. 26 has been stored in the storage unit. Note that the data shown in FIG. 26 may be stored in the storage unit in advance. The following describes highest density control processing of the present embodiment with reference to FIG. 30.

In step S20, the control unit 25 detects an instruction for changing the highest density setting, which is given by a user operation. Note that in the following description, it is assumed that the user has selected the highest density setting value "+2" for all of the colors. In step S21, the control unit 25 acquires the target line width from the conversion table shown in FIG. 31. For example, the target line width 137 μm is obtained in correspondence with the highest density setting value "+2".

In step S22, the control unit 25 calculates the difference between the target line width 137 μm and the reference line width (=127 μm). In this example, 137 μm−127 μm=+10 μm is calculated. Next, in step S23, the relationship between the amount of deviation from the reference line width and the peak value of the sensor output shown in FIG. 21 is used to specify the peak value of the sensor output that corresponds to the amount of deviation obtained in step S22, and the specified peak value of the sensory output is set as the target value. In this example, the amount of deviation of the target line width from the reference line width is +10 μm, and therefore according to FIG. 21, the ratio of the target value of the peak value of the sensor output to the highest value is 0.96. Next, in step S24, the control unit 25 uses the result obtained in the initial highest density calibration shown in FIG. 26 to determine the developing bias based on the target value of the peak value of the output signal of the sensor 27. Specifically, according to the graphs in FIG. 26, the highest value for the peak value of the output signal for yellow (Y) is 2.00 V. Accordingly, the target value of the peak value of the output signal of the sensor 27 is 1.92 (V), which is a factor of 0.96 of 2.00 V. Since the highest density setting value is "+2", which is darker than the standard density, the peak value 1.90 V that is closest to 1.92 V on the right side of the highest value in the graphs in FIG. 26 is selected, and the developing bias −305 V that was applied at that time can be derived. In this way, the developing bias that is to be used is determined to be "−305 V" based on the highest density setting value "+2". Accordingly, the present embodiment enables performing density control so as to achieve a desired highest density using the result of initial highest density calibration. Note that in the present embodiment as well, the developing bias can be determined by interpolating the results of measuring the developing bias and the peak value of the output signal.

In the fourth embodiment, the target line width that is to be used in highest density control is determined by the width of the light receiving units An and Ap of the optical sensor 27. In the present embodiment, highest density control can be performed independently of the width of the light receiving units An and Ap.

Sixth Embodiment

In the fourth embodiment, the number of light receiving units Ap and the number of light receiving units An are the same. In the present embodiment, there is one light receiving unit An and two light receiving units Ap, and a pattern image including one line is used. The present embodiment is described below focusing on differences from the fourth embodiment. Note that configuration of the image forming apparatus 101 according to the present embodiment will not be described since it is similar to that in the first embodiment.

Figure 32A:
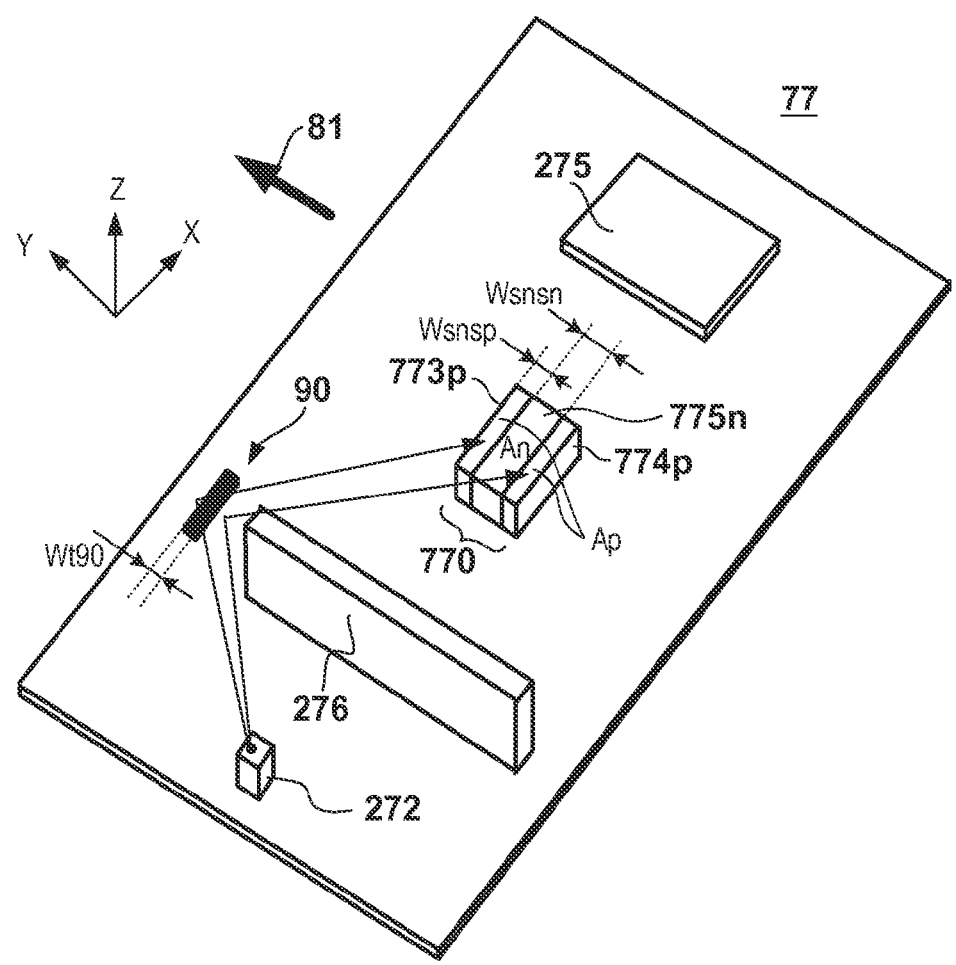
FIGS. 32A and 32B are schematic configuration diagrams of the optical sensor according to an embodiment.
Figure 32B:
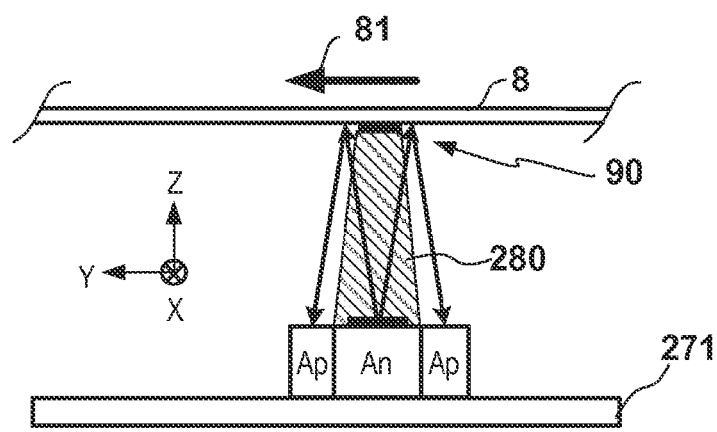

FIG. 32A is a perspective view of an optical sensor 77 of the present embodiment, and FIG. 32B is a view from the X direction in FIG. 32A. As shown in FIG. 32A, a pattern image 90 of the present embodiment is an image that includes one line with a width Wt90. Note that the optical sensor 77 is the result of replacing the light receiving unit 270 of the optical sensor 27 of the first embodiment with a light receiving unit 770, and other aspects of the configuration will not be described since they are similar to the optical sensor 27. The light receiving unit 770 is constituted by light receiving elements 773p, 775n, and 774p that are aligned in an array along the movement direction 81 of the intermediate transfer belt 8. Note that the light receiving element 775n constitutes the light receiving unit An, and the light receiving elements 773p and 774p each constitute a light receiving unit Ap. In this way, in the light receiving unit 770, the light receiving units Ap and the light receiving unit An are arranged alternatingly.

As shown in FIG. 32A, in the present embodiment, the width of the light receiving units Ap is Wsnsp, and the width Wsnsn of the light receiving unit An is double the width Wsnsp of the light receiving units Ap. In the present embodiment, the width Wsnsp of the light receiving units Ap is 127 μm, and the width Wsnsn of the light receiving unit An is 254 μm. Furthermore, the area of the light receiving region of each of the light receiving units Ap is half of the area of the light receiving region of the light receiving unit An, that is to say, the total area of the light receiving regions of the two light receiving units Ap is equal to the total area of the light receiving region of the light receiving unit An. Note that similarly to the fourth embodiment, the width of the light receiving region of the light receiving units Ap in the alignment direction is substantially equal to the width Wsnsp of the light receiving units Ap, and the width of the light receiving region of the light receiving unit An in the alignment direction is substantially equal to the width Wsnsn of the light receiving unit An. Furthermore, the width Wt90 of the line of the pattern image 90 is equal to the width Wsnsp of the light receiving units Ap, that is to say, is half of the width Wsnsn of the light receiving unit An. Accordingly, as shown in FIG. 32B, the width of the shadow formed by the line of the pattern image 90 is equal to the width Wsnsn of the light receiving unit An at the location of the light receiving unit 770. Note that similarly to the first embodiment, the length of the shadow formed by the line of the pattern image 90 in the X direction in FIG. 32A, is longer than the length of the light receiving units Ap and the light receiving unit An in the same direction. It should also be noted that the arrows in FIGS. 32A and 32B indicate light that has been emitted by the light emitting element 272 and undergone specular reflection at the surface of the intermediate transfer belt 8.

Figure 33:
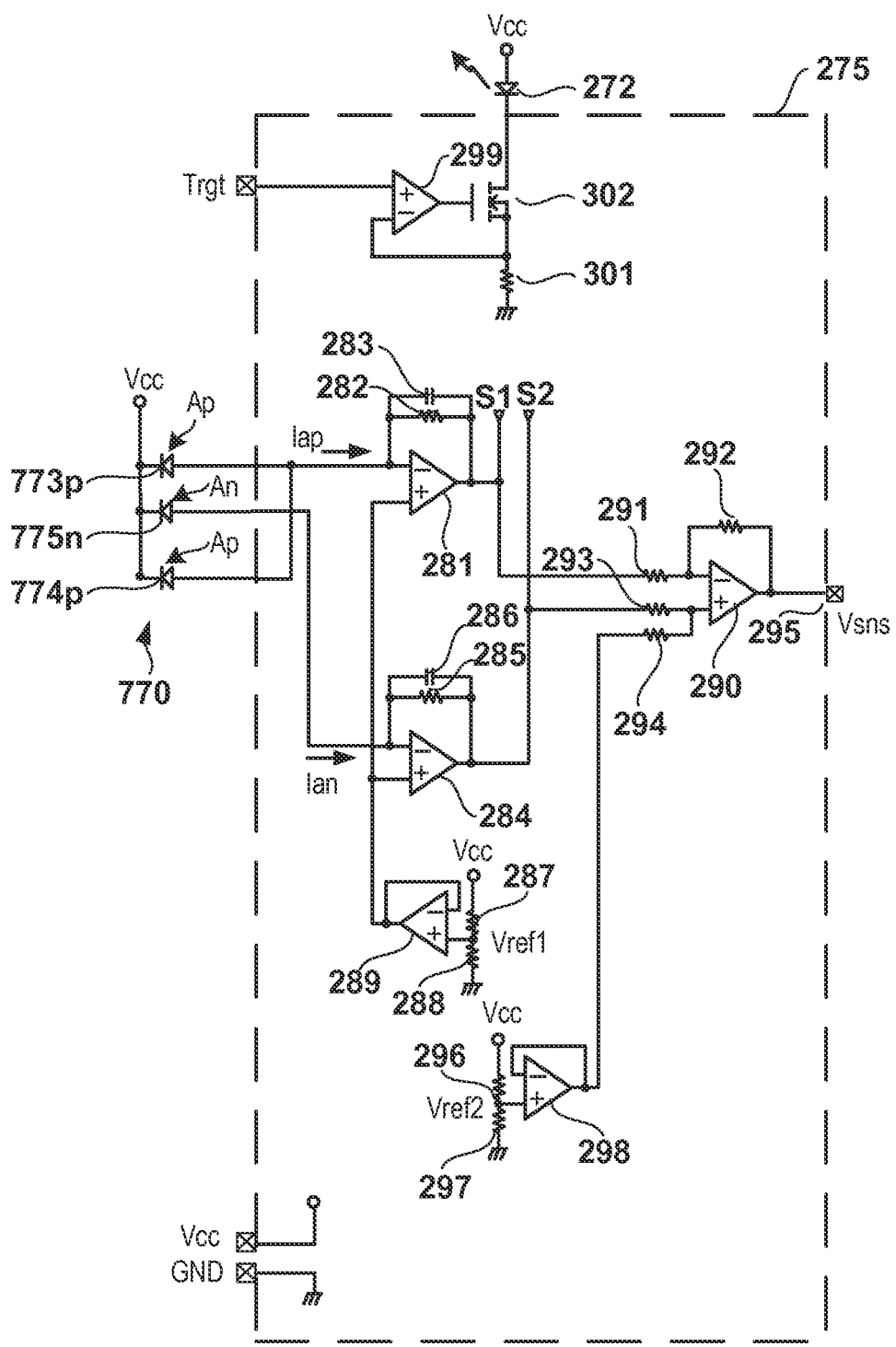
FIG. 33 is a schematic circuit diagram of the optical sensor according to an embodiment.

FIG. 33 shows the topology of the connection of the control circuit 275 to the light receiving unit 770 and the light emitting element 272. A difference from the configuration in FIG. 2 is that the light receiving elements 273p and 274p have been replaced with the light receiving elements 773p and 774p, and that the light receiving elements 273n and 274n have been replaced with the light receiving element 775n, and other aspects of the configuration are similar to the first embodiment. Accordingly, similarly to the first embodiment, the optical sensor 77 outputs a signal whose amplitude corresponds to a value obtained by subtracting the total amount of light received by the light receiving unit An from the total amount of light received by the light receiving units Ap.

Figure 34:
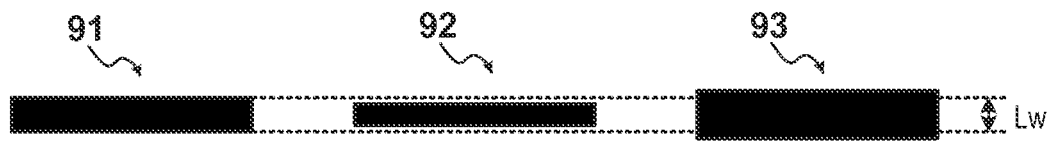
FIG. 34 is a diagram showing a pattern image according to an embodiment.

The following describes the detection of the pattern image 90 that includes one line by the optical sensor 77. FIG. 34 shows pattern images having different line widths. Note that the width Lw indicated by broken lines in FIG. 34 is the target line width that is to be achieved. Here, the target line width Lw is half of the width Wsnsn of the light receiving unit An, that is to say, is 127 μm. In other words, the target line width Lw is a value for forming a shadow whose width is equal to the width Wsnsn of the light receiving unit An at the location of the light receiving unit 770. Here, the line width of a pattern image 91 in FIG. 34 is the target line width Lw, the line width of the pattern image 92 is 101.6 μm, which is narrower than the target line width Lw, and the line width of the pattern image 93 is 152.4 μm, which is wider than the target line width Lw.

Figure 35:
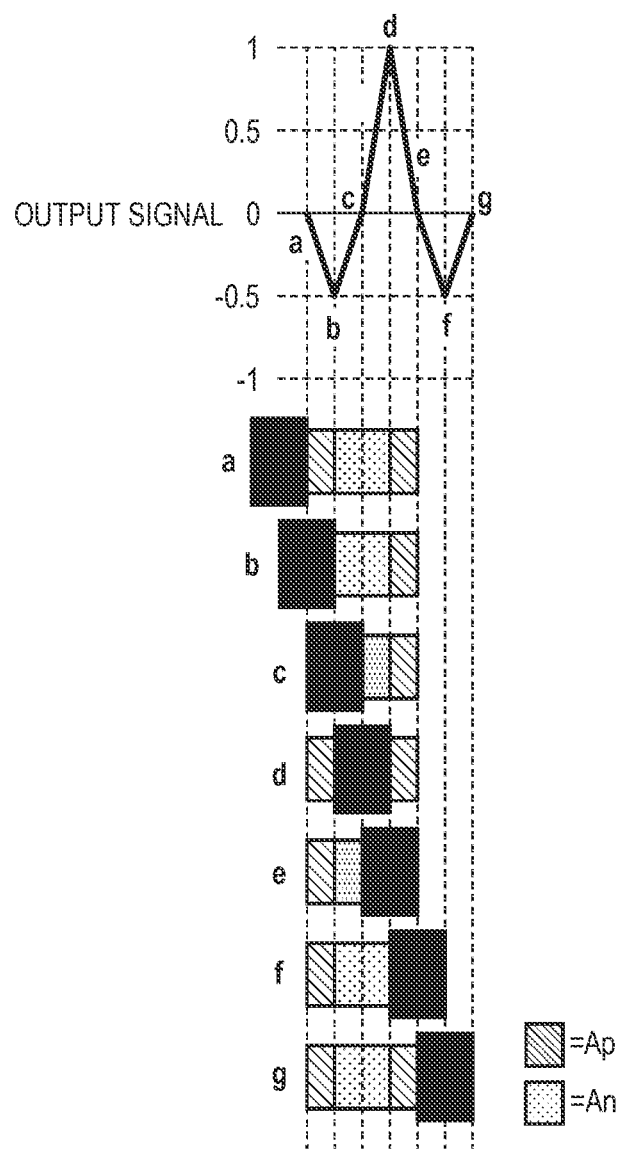
FIG. 35 is a diagram showing the output signal of the optical sensor in the case of detecting a pattern image whose line width is the same as the target line width, according to an embodiment.

FIG. 35 shows an output signal of the optical sensor 77 when the pattern image 91 in FIG. 34 is detected. Note that the positional relationship between the light receiving unit 770 and the shadow that appears due to the line and moves in accordance with the movement of the pattern image 91 is shown below the output signal. It should also be noted that the output signal is normalized such that the value thereof is "0" at the reference voltage Vref2, that is to say, when the total amount of light received by the light receiving units Ap and the total amount of light received by the light receiving units An are the same, and such that the highest value of the output signal is "1".

State a is a state in which the line shadow does not cover any of the light receiving units Ap and An. In this case, the total amount of light received by the light receiving units Ap and the total amount of light received by the light receiving unit An are the same, and thus the output of the optical sensor 77 is "0". State b is a state in which the line shadow covers one light receiving unit Ap. In this case, the total amount of light received by the light receiving unit An is double the total amount of light received by the light receiving units Ap, and the output of the optical sensor 77 is "−0.5". State c is a state in which the line shadow covers one light receiving unit Ap and half of the light receiving unit An, and the total amount of light received by the light receiving units Ap and the total amount of light received by the light receiving unit An are equal to each other, and thus the output of the optical sensor 77 is "0". State d is a state in which the line shadow covers the entirety of the light receiving unit An. In this case, the total amount of light received by the light receiving unit An is substantially "0", and the output of the optical sensor 77 is "+1.0", which is the highest value. State e is a state in which, likewise to the state c, the line shadow covers one light receiving unit Ap and half of the light receiving unit An, and the output of the optical sensor 77 is "0". State f is a state in which, likewise to the state b, the line shadow covers one light receiving unit Ap, and the output of the optical sensor 77 is "−0.5". State g is a state in which, likewise to the state a, the line shadow does not cover any of the light receiving units, and the output of the optical sensor 77 is "0".

FIG. 36 shows an output signal of the optical sensor 27 when a pattern image 92 in FIG. 34 is detected. The notation in FIG. 36 is the same as that in FIG. 35. Note that the peak value of the output signal is normalized such that the peak value when the pattern image 91 in FIG. 35 is detected is "1". As shown in FIG. 36, the line width of the pattern image 92 is a factor of 0.8 of the target line width, and therefore the shadow does not cover the entirety of the light receiving unit An. Accordingly, similarly to the state d, even if the entirety of the shadow formed by the line covers the light receiving unit An, the light receiving unit An receives specular reflection light. Accordingly, the highest value of the difference between the total amount of light received by the light receiving units Ap and the total amount of light received by the light receiving unit An is lower than that in the state d in FIG. 35. Specifically, the peak value of the output signal of the optical sensor 77 when the pattern image 92 is detected is 0.8. Here, the ratio of the line widths of the pattern image 91 and the pattern image 92 is shown below.

127 μm:101.6 μm=1:0.8

In other words, the peak value of the output signal of the optical sensor 77 decreases in proportion to a decrease in the line width below the target value.

FIG. 37 shows an output signal of the optical sensor 77 when a pattern image 93 in FIG. 34 is detected. Note that the notation in FIG. 37 is the same as that in FIG. 35. As shown in FIG. 37, the line width of the pattern image 93 is a factor of 1.2 of the target width, and therefore there is no state in which the shadow covers only the light receiving unit An, but rather the shadow covers the entirety of the light receiving unit An as well as a portion of one or both of the light receiving units Ap. Accordingly, when the shadow formed by the line covers the entirety of the light receiving unit An as shown in the state d, portions of the light receiving units Ap are also covered, and therefore the difference between the total amount of light received by the light receiving units Ap and the total amount of light received by the light receiving unit An is lower than in the state d in FIG. 35. Specifically, the peak value of the output signal of the optical sensor 77 when the pattern image 93 is detected is 0.8. Here, the ratio of the line widths of the pattern image 91 and the pattern image 93 is shown below.

127 μm:152.4 μm=1:1.2

The amount of deviation of the line width of the pattern image 93 from the line width of the pattern image 91 is 25.4 μm, and the ratio of the deviation amount is 0.2 (=25.4÷127).

On the other hand, using the peak value when the pattern image 91 is detected as the reference, the amount of deviation of the peak value when the pattern image 93 is detected from the reference value is 0.2 (=1−0.8). In this way, when the line width is wider than the target value, the amount of deviation of the peak value of the output signal of the optical sensor 77 from the reference value matches the amount of deviation of the line width from the target value.

Figure 38:
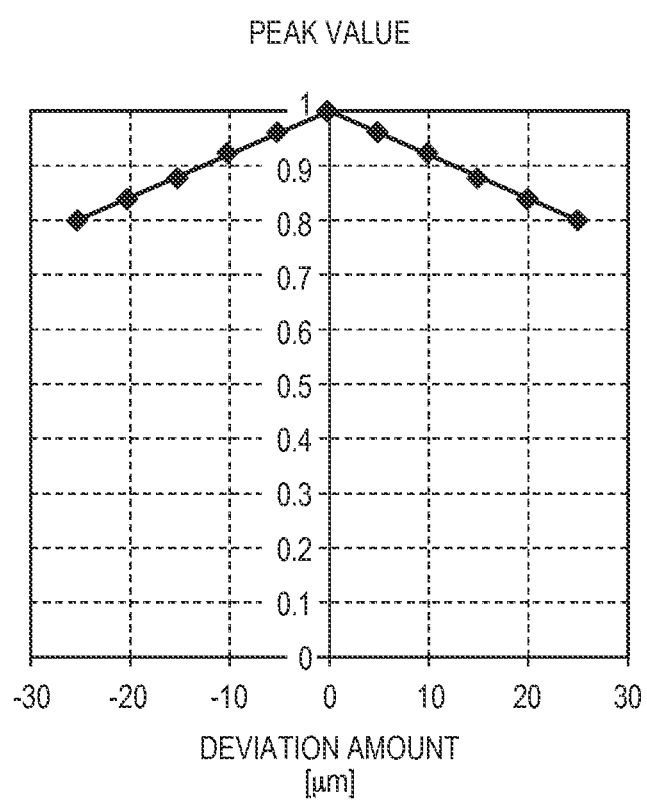
FIG. 38 is a diagram showing a relationship between the amount of deviation of the line width of the pattern image from a target value and the peak value of the output signal of the optical sensor.

As described above, in the present embodiment, the peak value of the output signal of the optical sensor 77 is the highest when the width of the shadow formed by the line is the same as the width of the light receiving unit An, and the peak value of the output signal of the optical sensor 77 decreases if the line width is higher or lower than the width of the light receiving unit An. FIG. 38 shows the relationship between the amount of deviation from the target line width and the peak value of the output signal of the optical sensor 77. Note that the peak value of the output signal of the optical sensor 77 is not dependent on the movement speed (rotation speed) of the intermediate transfer belt 8. In this way, the characteristics shown in FIG. 38 can be used to execute the density correction calibration described in the fourth embodiment and the fifth embodiment. In the present embodiment, the detection image can be smaller than in the fourth embodiment and the fifth embodiment since a pattern image including one line is used.

Note that in the present embodiment, the light receiving unit 770 of the optical sensor 77 has two light receiving units Ap and one light receiving unit An. However, it is possible for (n+1) light receiving units Ap and n light receiving units An to be arranged alternatingly (n being a natural number), such as the case where three light receiving units Ap and two light receiving units An are arranged alternatingly. In this case, the sum of the areas of the light receiving regions of the two light receiving units Ap arranged at the respective ends of the light receiving unit 770 is equal to the area of the light receiving region of each of the other light receiving units Ap and An of the light receiving unit 770. Also, the alignment-direction width of the light receiving region is the same for the light receiving units other than those at the ends of the light receiving unit 770, and is double the alignment-direction width of the light receiving region of the two light receiving units Ap arranged at the ends of the light receiving unit 770. Note that although a mode in which the number of light receiving units Ap is one more than the number of light receiving units An, and light receiving units Ap are arranged at respective ends of the light receiving unit 770 has been described, a mode is possible in which the light receiving units Ap and the light receiving units An are interchanged.

Other Embodiments

Note that in the above-described embodiments, differential processing is performed on signals indicating change over time in the amount of light received by the light receiving units Ap and the light receiving units An. The light receiving units Ap and the light receiving units An are arranged along the movement direction of the intermediate transfer belt 8. Accordingly, the change over time in the amount of light received by the light receiving units Ap and the light receiving units An deviates between the light receiving units Ap and the light receiving units An by amount of time that is determined by the distance between the light receiving units Ap and the light receiving units An and by the movement speed of the intermediate transfer belt 8. Accordingly, the differential processing performed on the signals indicating change over time in the amount of light received by the light receiving units Ap and the light receiving units An can be realized by, for example, dividing a signal corresponding to the amount of received light output by one light receiving unit into two branches, and then performing differential processing by shifting the two branches by a predetermined amount of time. The amount of shift time in this case is an amount of time determined by the distance between the light receiving units Ap and the light receiving units An and by the movement speed of the intermediate transfer belt 8. In other words, in the above-described embodiments, differential processing is performed on the total amount of light received by one or more light receiving units Ap and the total amount of light received by one or more light receiving units An, but this is equivalent to performing differential processing on the sum of one or more first time positions and the sum of one or more second time positions with respect to a signal indicating the amount of light received by one light receiving unit. For example, when a pattern image including multiple lines is moved, the amount of light received by a light receiving unit varies with a cycle that corresponds to the lines. Accordingly, in one example, the first time positions are set such that the cycles are mutually in-phase, and the second time positions are also set such that cycles are mutually in-phase. This corresponds to the case where, for example, the time interval between the first time positions is set to the time required for the intermediate transfer belt 8 to move a distance corresponding to the line pitch. The same follows for the time interval between the second time positions. However, the first time positions and the second time positions are set such that the phases of their cycles are different, such as being opposite phases.

Also, the above embodiments describe the relationship between the line width and the alignment-direction widths of the light receiving regions of the light receiving units Ap and the light receiving units An. Here, the light receiving units Ap and An receive reflection light from a certain region at their light receiving regions at the same time, and this is equivalent to obtaining the average value of reflection light received at the same time. Accordingly, increasing the alignment-direction width of the light receiving region is equivalent to, for example, obtaining the moving average for signals indicating change over time in the amounts of received light output by the light receiving units Ap and the light receiving units An. Here, in a mode in which differential processing is performed on different time positions of a signal output by one light receiving unit, a memory is necessary in order to branch the signal and shift the branched signals. Accordingly, using this memory enables easily setting two sections, namely a first section and a second section, in a signal output by one light receiving unit, and performing differential processing on the moving average value of the first section and the moving average value of the second section. Accordingly, it is possible to easily set a section that corresponds to the line width without changing the width of the light receiving region. Note that in this case, the time interval between the first section and the second section corresponds to the distance between the light receiving units Ap and the light receiving units An in the above-described embodiments, and the section lengths of the first section and the second section correspond to the alignment-direction widths of the light receiving regions.

Figure 16:
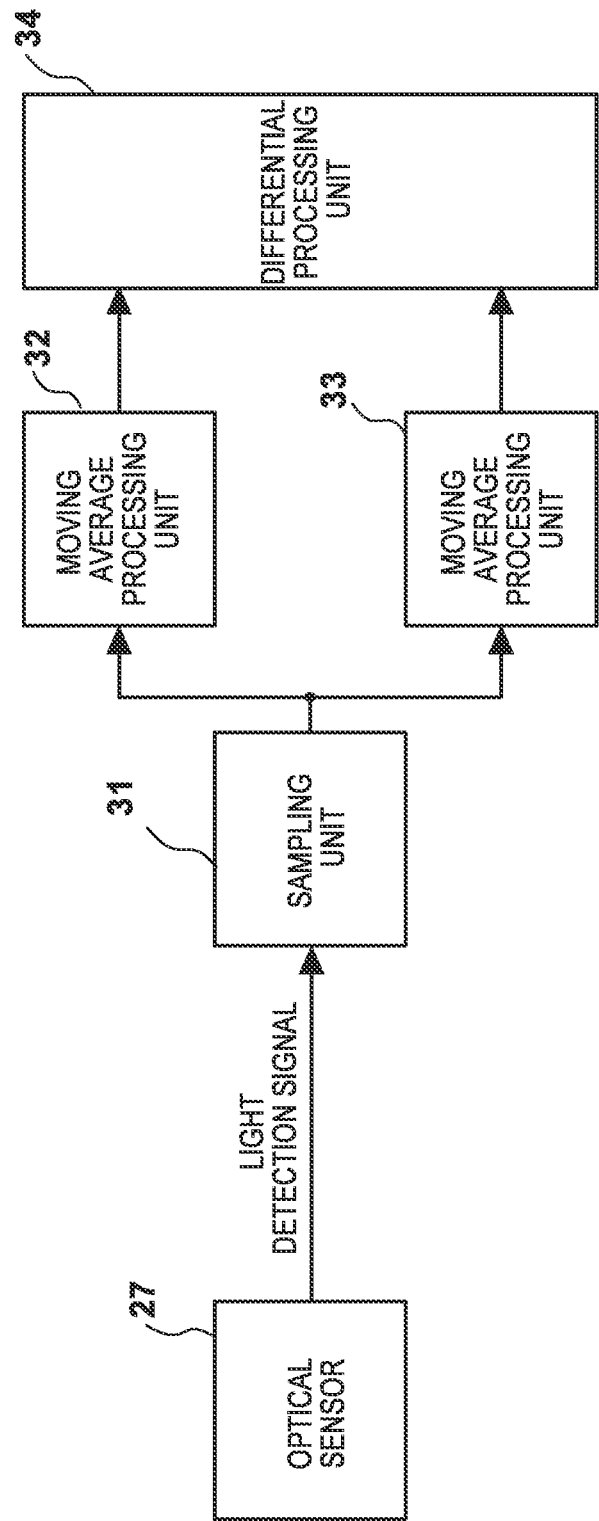
FIG. 16 is a diagram for describing processing with respect to the output signal of the optical sensor according to an embodiment.

FIG. 16 is a diagram of a configuration for performing the above-described processing on a signal output by one light receiving unit. Note that in this mode for performing differential processing on different times in a signal output by one light receiving unit, the optical sensor 27 simply outputs a light detection signal corresponding to the amount of light received by the light receiving unit to the engine control unit 25, for example. Note that a sampling unit 31, moving average processing units 32 and 33, and a differential processing unit 34 in FIG. 16 are provided in the engine control unit 25, for example. However, the sampling unit 31, the moving average processing units 32 and 33, and the differential processing unit 34 may be provided in the control circuit 275, for example. The light detection signal is sampled by the sampling unit 31 and output to the moving average processing units 32 and 33. The moving average processing units 32 and 33 obtain the moving average values of sections of a predetermined length, and output the obtained moving average values to the differential processing unit 34. Note that the amount of time between the section corresponding to the moving average value output by the moving average processing unit 32 and the section corresponding to the moving average value output by the moving average processing unit 33 at the same time is, as described above, set such that the phases of the light detection signals are different, for example. The differential processing unit 34 performs differential processing on the moving average values from the moving average processing units 32 and 33. According to this configuration, the differential processing unit 34 outputs an output signal that is similar to the output signal of the differential amplifier 290 in FIG. 2.

Note that in other words, it can be said that the above-described embodiment obtains the difference between amounts of reflection light that include specular reflection light components from different positions on the pattern image as well as the surface of the intermediate transfer belt 8 in front of and behind the pattern image. For example, this is clear from the fact that the specular reflection light received by the light receiving units Ap and the light receiving units An at the same time has been reflected from different positions on the pattern image and the surface of the intermediate transfer belt 8 in front of and behind the pattern image. Also, the mode in which differential processing is performed on different time positions in a signal output by one light receiving unit corresponds to obtaining the difference between amounts of reflection light that include specular reflection light components reflected at different positions on the pattern image and the surface of the intermediate transfer belt 8 around the pattern image. For example, differential processing is performed on a first time position in a light detection signal and a second time position that is after the first time position. Note that the first position is a position in the pattern image corresponding to a specular reflection point to the light receiving unit at a first time, and the second position is a specular reflection point to the light receiving unit at a second time. In this case, the distance between the first position and the second position is equal to a value obtained by multiplying the movement speed of the surface of the intermediate transfer belt 8 by the difference between the first time and the second time. Thus, performing differential processing on the first time position and the second time position corresponds to performing differential processing on the total amount of received light when the light receiving unit receives specular reflection light from the first position and the total amount of received light when the light receiving unit receives specular reflection light from the second position.

As described above, due to the light emitting element irradiating the intermediate transfer belt 8 with divergent beams, a range of the intermediate transfer belt 8 that is wide to a certain degree is illuminated by the light emitting element. Accordingly, diffuse reflection light from the lines of the pattern image that is received by the light receiving element is substantially constant while the pattern image passes the irradiation region. Accordingly, it is possible to eliminate or suppress diffuse reflection light using the difference between the amounts of light received by multiple light receiving elements or the difference between amounts of light received by one light receiving element at different time positions, and to extract only the specular reflection light component. This configuration enables performing density control in which the influence of diffuse reflection light is suppressed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-277435, filed on Dec. 19, 2012, and Japanese Patent Application No. 2012-277437, filed on Dec. 19, 2012, which are hereby incorporated by reference herein in their entirety.

What is claimed is:

1. An image forming apparatus comprising:
an image carrier,
an image forming unit configured to form, on the image carrier, a detection image that has one or more lines in a direction different from a movement direction of a surface of the image carrier;
a light emitting unit configured to emit light toward the image carrier on which the detection image is formed;
a light receiving unit configured to receive reflection light of the light emitted by the light emitting unit, and output a detection signal that corresponds to an amount of received reflection light including a specular reflection light component;
a detection unit configured to output, as an output signal, a signal that corresponds to a difference between a detection signal value that corresponds to an amount of reflection light received from a first position at which the detection image is formed and a detection signal value that corresponds to an amount of reflection light received from a second position different from the first position; and
a control unit configured to control an image formation condition related to density of an image to be formed, based on a peak value of the output signal of the detection unit.

2. The image forming apparatus according to claim 1, wherein the control unit is further configured to form a plurality of detection images on the image carrier using different values for the image formation condition, and control the image formation condition such that the peak value of the output signal is a target value.

3. The image forming apparatus according to claim 2, wherein the target value is a highest value among the peak values of the output signals that are output when the plurality of detection images are detected by the detection unit.

4. The image forming apparatus according to claim 2, wherein the target value is indicated by a ratio with respect to a highest value among the peak values of the output signals that are output when the plurality of detection images are detected by the detection unit.

5. The image forming apparatus according to claim 1, wherein the light receiving unit includes one or more first light receiving units and one or more second light receiving units that are arranged alternatingly, and
the detection unit is further configured to output, as the output signal, a signal that corresponds to a difference between a total amount of light received by the one or more first light receiving units and a total amount of light received by the one or more second light receiving units.

6. The image forming apparatus according to claim 5, wherein the light receiving area of each of the one or more first light receiving units is equal to the light receiving area of each of the one or more second light receiving units.

7. The image forming apparatus according to claim 5,
wherein a width of a light receiving region of each of the one or more first light receiving units in an alignment direction that is a direction in which the one or more first light receiving units and the one or more second light receiving units are arranged alternatingly is equal to a width of a light receiving region of each of the one or more second light receiving units in the alignment direction.

8. The image forming apparatus according to claim 5,
wherein the detection image includes a plurality of lines that are arranged along the movement direction of the surface of the image carrier, and that extend in a direction that is orthogonal to the movement direction,
the light receiving unit has a plurality of the first light receiving units and a plurality of the second light receiving units, and
a pitch of light and dark regions formed at a position of the light receiving unit due to the detection image being irradiated by the light emitting unit is equal to a pitch of the first light receiving units and a pitch of the second light receiving units.

9. The image forming apparatus according to claim 5,
wherein each of two ends of the light receiving unit is the first light receiving unit, and
light receiving areas of each of the first and second light receiving units excluding the first light receiving units arranged at the two ends of the light receiving unit are equal to each other, and are equal to a sum of the light receiving areas of the two first light receiving units arranged at the ends.

10. The image forming apparatus according to claim 5,
wherein each of two ends of the light receiving unit is the first light receiving unit, and
widths of light receiving regions, in an alignment direction that is a direction in which the first light receiving units and the second light receiving units are arranged alternatingly, of each of the first and second light receiving units excluding the first light receiving units arranged at the two ends of the light receiving unit are equal to each other, and are double widths, in the alignment direction, of the light receiving regions of the first light receiving units arranged at the ends.

11. The image forming apparatus according to claim 5,
wherein each of the first light receiving units and the second light receiving units includes one or more light receiving element.

12. The image forming apparatus according to claim 1,
wherein the detection unit is further configured to output, as the output signal, a signal that corresponds to a difference between a detection signal that corresponds to a first time position and a detection signal that corresponds to a second time position that is separated from the first time position by a predetermined amount of time.

13. The image forming apparatus according to claim 12,
wherein the detection image includes a plurality of lines that are arranged along the movement direction of the surface of the image carrier, and that extend in a direction that is different from the movement direction, and
the predetermined amount of time is different from a cycle of variation in the detection signal occurring due to the plurality of lines.

14. The image forming apparatus according to claim 1,
wherein the image forming unit forms a detection image that has a plurality of lines in a direction different from the movement direction of the surface of the image carrier, and
the detection unit outputs, as the output signal, a signal that corresponds to a difference between a sum of detection signal values that correspond to a plurality of first time positions and a sum of detection signal values that correspond to a plurality of second time positions that are separated from the first time positions by a predetermined amount of time.

15. The image forming apparatus according to claim 14,
wherein the detection signal values corresponding to the first time positions are an average value of a first section, and the detection signal values corresponding to the second time positions are an average value of a second section that is separated from the first section by the predetermined amount of time.

16. The image forming apparatus according to claim 14,
wherein a time interval between the plurality of first time positions and a time interval between the plurality of second time positions correspond to an amount of time required for the image carrier to move a distance corresponding to a pitch of the plurality of lines.

17. The image forming apparatus according to claim 1,
wherein the image forming unit is further configured to, during printing, change the image formation condition related to density while forming the detection image between images formed on the image carrier that are to be printed.

18. The image forming apparatus according to claim 17,
wherein the image forming unit comprises a photosensitive member, a charging unit configured to charge the photosensitive member, an exposing unit configured to form an electrostatic latent image by exposing the photosensitive member, and a developing unit configured to develop the electrostatic latent image with a developer by applying a developing bias, and
the image formation condition is a developing contrast that is a difference between the developing bias and a potential at a position on the photosensitive member exposed by the exposing unit.

19. The image forming apparatus according to claim 18,
wherein the control unit is further configured to control the developing contrast while printing is not being performed by changing an exposure intensity of the exposing unit, and control the developing contrast during printing by changing the developing bias.

20. The image forming apparatus according to claim 1,
wherein the second position is a position where the detection image is not formed.

21. An image forming apparatus comprising:
an image carrier;
an image forming unit configured to form, on the image carrier, a detection image that has one or more lines in a direction different from a movement direction of a surface of the image carrier;
a light emitting unit configured to emit light toward the image carrier on which the detection image is formed;
a light receiving unit configured to receive reflection light of the light emitted by the light emitting unit, and output a detection signal that corresponds to an amount of received reflection light including a specular reflection light component;
a detection unit configured to output, as an output signal, a signal that corresponds to a difference between a detection signal value that corresponds to an amount of reflection light received from a first position at which the detection image is formed and a detection signal value that corresponds to an amount of reflection light received from a second position different from the first position; and a control unit configured to control an image formation condition related to density of an image to be formed, based on a peak value of the output signal of the detection unit, wherein the detection unit outputs, as the output signal, a signal that corresponds to a difference between an average value of a first section and an average value of a second section that is separated from the first section by a predetermined amount of time.

22. An image forming apparatus comprising:
an image carrier,
an image forming unit configured to form, on the image carrier, a detection image that has one or more lines in a direction different from a movement direction of a surface of the image carrier;
a light emitting unit configured to emit light toward the image carrier on which the detection image is formed;
a light receiving unit configured to receive reflection light of the light emitted by the light emitting unit, and output a detection signal that corresponds to an amount of received reflection light including a specular reflection light component;
a detection unit configured to output, as an output signal, a signal that corresponds to a difference between a detection signal value that corresponds to an amount of reflection light received from a first position at which the detection image is formed and a detection signal value that corresponds to an amount of reflection light received from a second position different from the first position; and
a control unit configured to control an image formation condition related to density of an image to be formed, based on a peak value of the output signal of the detection unit,
wherein the image forming unit is further configured to, during printing, change the image formation condition related to density while forming the detection image between images formed on the image carrier that are to be printed, and
wherein the control unit is further configured to, while printing is not being performed, change the image formation condition related to density while forming, on the image carrier, an image having a plurality of lines in a direction different from the movement direction of the surface of the image carrier, detect the image with the detection unit, and set a peak value of the output signal of the detection unit as a target value for the image formation condition.

23. An image forming apparatus comprising:
an image carrier,
an image forming unit configured to form, on the image carrier, a detection image that has one or more lines in a direction different from a movement direction of a surface of the image carrier;
a light emitting unit configured to emit light toward the image carrier on which the detection image is formed;
a light receiving unit configured to receive reflection light of the light emitted by the light emitting unit, and output a detection signal that corresponds to an amount of received reflection light including a specular reflection light component;
a detection unit configured to output, as an output signal, a signal that corresponds to a difference between a detection signal value that corresponds to an amount of reflection light received from a first position at which the detection image is formed and a detection signal value that corresponds to an amount of reflection light received from a second position different from the first position; and
a control unit configured to control an image formation condition related to density of an image to be formed, based on a peak value of the output signal of the detection unit,
wherein the control unit forms the detection image using image data in which a width of the line in a movement direction of the surface of the image carrier is M dots (M being an integer) and a distance between lines is N dots (N being an integer), where M<N.

24. The image forming apparatus according to claim 23, wherein letting A be a ratio of a diameter of one actually formed dot to a calculated diameter of one toner image dot, the number of dots N is an integer obtained by a value obtained from M+(A−1)×2 being rounded up or rounded down to an integer.

25. The image forming apparatus according to claim 23, wherein a scan time is defined for each pixel in the image data.

26. An image forming apparatus comprising:
an image carrier,
an image forming unit configured to form, on the image carrier, a detection image that has one or more lines in a direction different from a movement direction of a surface of the image carrier;
a light emitting unit configured to emit light toward the image carrier on which the detection image is formed;
a light receiving unit configured to receive reflection light of the light emitted by the light emitting unit, and output a detection signal that corresponds to an amount of received reflection light including a specular reflection light component;
a detection unit configured to output, as an output signal, a signal that corresponds to a difference between a detection signal value that corresponds to an amount of reflection light received from a first position at which the detection image is formed and a detection signal value that corresponds to an amount of reflection light received from a second position different from the first position; and
a control unit configured to control an image formation condition related to density of an image to be formed, based on the output signal of the detection unit.

* * * * *